(12) United States Patent
Saito

(10) Patent No.: US 10,663,293 B2
(45) Date of Patent: May 26, 2020

(54) MARKER FORMED OF OPTICALLY TRANSPARENT MATERIAL

(71) Applicant: Enplas Corporation, Saitama (JP)

(72) Inventor: Tomohiro Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/079,658

(22) PCT Filed: Feb. 22, 2017

(86) PCT No.: PCT/JP2017/006595
§ 371 (c)(1),
(2) Date: Aug. 24, 2018

(87) PCT Pub. No.: WO2017/146097
PCT Pub. Date: Aug. 31, 2017

(65) Prior Publication Data
US 2019/0056219 A1 Feb. 21, 2019

(30) Foreign Application Priority Data

Feb. 24, 2016 (JP) .................................. 2016-032857
Mar. 31, 2016 (JP) .................................. 2016-071099
(Continued)

(51) Int. Cl.
*G02B 3/04* (2006.01)
*G01B 11/26* (2006.01)
(Continued)

(52) U.S. Cl.
CPC .............. *G01B 11/26* (2013.01); *G01B 11/00* (2013.01); *G02B 3/04* (2013.01); *G02B 3/06* (2013.01); *G03B 35/00* (2013.01); *G03B 35/18* (2013.01)

(58) Field of Classification Search
CPC .......... G01B 11/26; G01B 11/00; G02B 3/04; G02B 3/06; G03B 35/00; G03B 35/18
See application file for complete search history.

(56) References Cited

U.S. PATENT DOCUMENTS 5,642,226 A * 6/1997 Rosenthal ............ G02B 3/0031
359/454
6,369,949 B1 4/2002 Conley
(Continued)

FOREIGN PATENT DOCUMENTS

| JP | 2012-145559 A | 8/2012 |
| JP | 2013-025043 A | 2/2013 |
| WO | 2015141601 | 9/2015 |

OTHER PUBLICATIONS

International Search Report from International Application No. PCT/JP2017/006595 dated May 16, 2017.
(Continued)

*Primary Examiner* — Cara E Rakowski
*Assistant Examiner* — Magda Cruz
(74) *Attorney, Agent, or Firm* — Brundidge & Stanger, P.C.

(57) ABSTRACT

This marker comprises: a plurality of convex surfaces (121) that are formed of a translucent material and that are disposed at least along an X direction; and a plurality of to-be-detected parts which are disposed at front/rear positions with respect to the plurality of convex surfaces (121) and which are projected onto the plurality of convex surfaces (121) as optically detectable images. The plurality of to-be-detected parts are disposed so as to be positioned on the same virtual plane which is perpendicular to a Z direction of the marker. The virtual plane is positioned between a focal point (F) on an image plane (B) of the convex surface (121) in the Z direction and a high point (F) of the image plane.

3 Claims, 14 Drawing Sheets

(30) Foreign Application Priority Data

Aug. 9, 2016 (JP) ................................ 2016-156762
Oct. 25, 2016 (JP) ................................ 2016-208758

(51) Int. Cl.
*G02B 3/06* (2006.01)
*G01B 11/00* (2006.01)
*G03B 35/00* (2006.01)
*G03B 35/18* (2006.01)

(56) References Cited

U.S. PATENT DOCUMENTS

| | | | |
|---|---|---|---|
| 9,366,876 B2 * | 6/2016 | Takushima | G02B 27/2214 |
| 9,442,224 B2 * | 9/2016 | Moon | G02B 3/005 |
| 2010/0277806 A1 * | 11/2010 | Lundvall | G02B 27/2214 |
| | | | 359/622 |
| 2014/0160572 A1 | 6/2014 | Moon | |
| 2016/0167421 A1 * | 6/2016 | Holmes | B42D 25/00 |
| | | | 283/75 |
| 2017/0082843 A1 | 3/2017 | Izawa | |

OTHER PUBLICATIONS

Toshirou Kishikawa, "Basic Optics for User Engineer", Optronics CO., Ltd, pp. 104-107., Nov. 26, 1990.
Extended European Search Report dated Sep. 2, 2019 from EP Application No. 17756535.5, 7 pages.

* cited by examiner

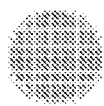
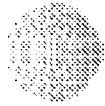
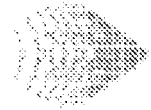
FIG. 6A        FIG. 6B        FIG. 6C
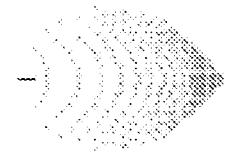
FIG. 6D        FIG. 6E        FIG. 6F
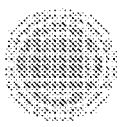
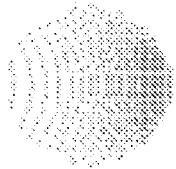
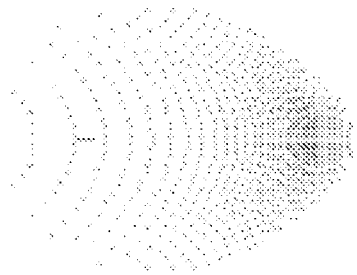
FIG. 6G        FIG. 6H        FIG. 6I

MARKER FORMED OF OPTICALLY TRANSPARENT MATERIAL

TECHNICAL FIELD

The present invention relates to a marker.

BACKGROUND ART

As an image indicator (marker) employing a combination of a lens and a mark, an image indicating sheet including a lenticular lens and an image formation layer is known. The lenticular lens has a structure in which a plurality of cylindrical lenses are arranged side by side. In addition, the image formation layer is a mark corresponding to each cylindrical lens. When the image indicator is viewed from the side of the convex surface parts of the cylindrical lenses, the image of the mark moves or deforms depending on the viewing positions. The image indicator is suitable for a marker for recognizing position, orientation and the like of an object in the fields of augmented reality (AR), robotics, and the like. In addition, the arrangement mark and the like in various uses have been variously studied (see, for example, PTL 1 and PTL 2).

CITATION LIST

Patent Literature

PTL 1
Japanese Patent Application Laid-Open No. 2013-025043
PTL 2
Japanese Patent Application Laid-Open No. 2012-145559

SUMMARY OF INVENTION

Technical Problem

When the image indicators according to PTLS 1 and 2 are used as markers, it is preferable that the detection angle of the image indicator be wide. In order to widen the detection angle of a marker, it is conceivable to reduce the curvature radius of the cylindrical lens so as to reduce the focal length of cylindrical lens. In addition, it is conceivable to integrally produce an image indicator used as a marker by injection molding. In this case, in view of improving the productivity of the image indicator by injection molding, it is preferable that the curvature radius of the cylindrical lens be large.

That is, when the image indicators according to PTLS 1 and 2 are used as markers, it is difficult to simultaneously achieve a wide detection angle and downsizing of the image indicator.

An object of the present invention is to provide a marker which can be downsized while achieving a wide detection angle.

Solution to Problem

A marker according to an embodiment of the present invention is formed of an optically transparent material, and includes: a plurality of convex surfaces disposed at least along a first direction; and a plurality of detection object parts respectively disposed opposite to the plurality of convex surfaces, and configured to be respectively projected onto the plurality of convex surfaces in a form of optically detectable images. The plurality of detection object parts are disposed between respective convex surfaces and focal points of respective convex surfaces in a height direction of the marker and disposed on one virtual plane perpendicular to the height direction of the marker, the focal points being points remotest from respective convex surfaces in image planes of respective convex surfaces, the image planes being curved by field curvature. Each image plane is defined by one optical unit including one of the plurality of convex surfaces

Advantageous Effects of Invention

According to the present invention, it is possible to provide a marker which can be downsized while achieving a wide detection angle.

BRIEF DESCRIPTION OF DRAWINGS

FIGS. 6A to 6I show results of a simulation.

DESCRIPTION OF EMBODIMENTS

A marker according to embodiments of the present invention is described below with reference to the accompanying drawings.

Embodiment 1
Configuration of Marker

Figure 1A:
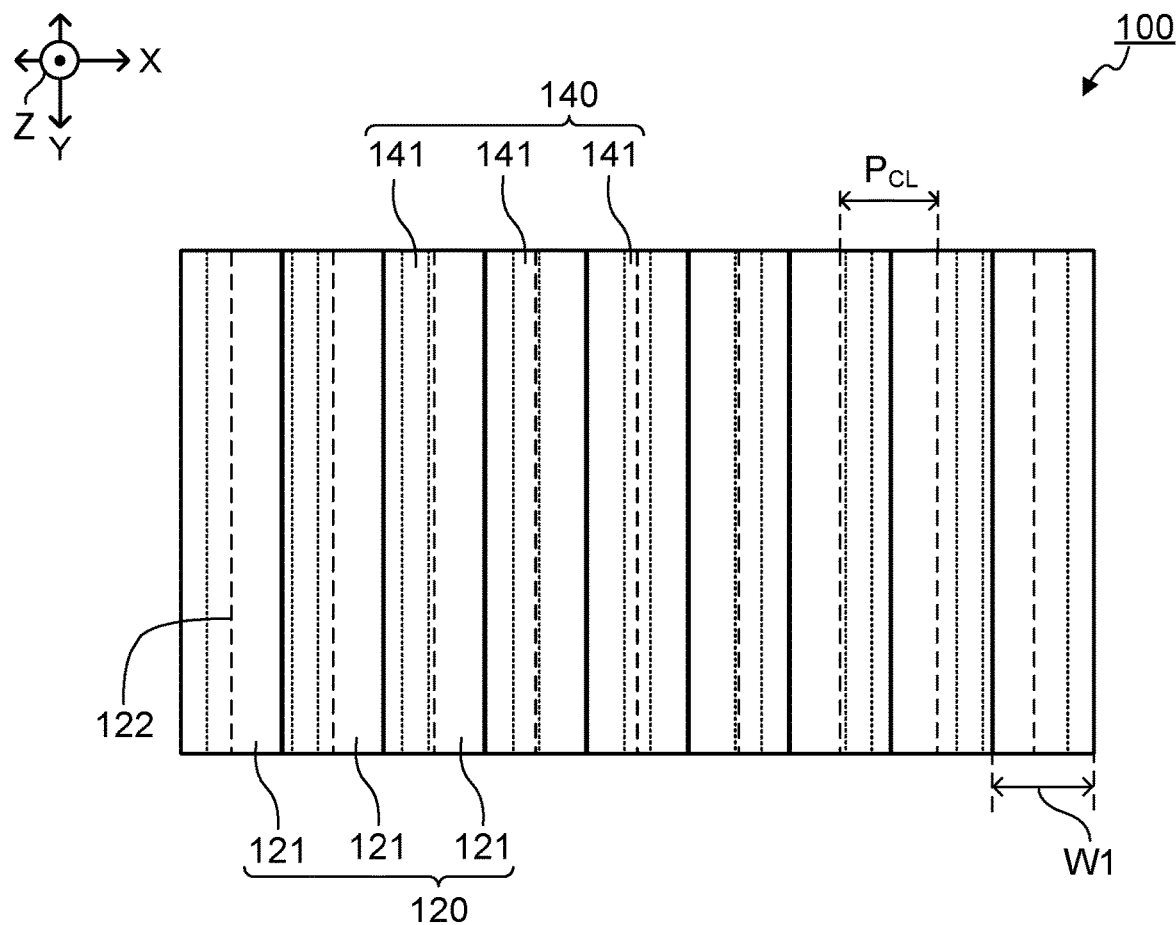
FIGS. 1A and 1B schematically illustrate a configuration of a marker according to Embodiment 1 of the present invention.
Figure 1B:
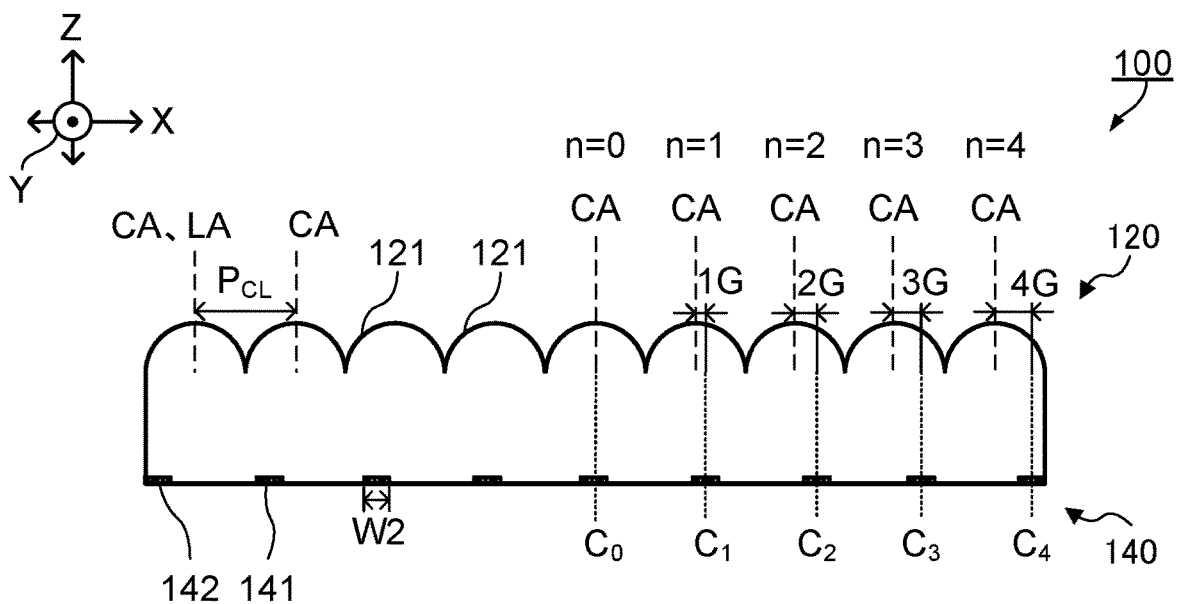

FIGS. 1A and 1B illustrate a configuration of marker 100 according to Embodiment 1 of the present invention. FIG. 1A is a plan view of marker 100, and FIG. 1B is a front view of marker 100.

As illustrated in FIG. 1A and FIG. 1B, marker 100 includes front surface (first surface) 120 and rear surface (second surface) 140. The material of marker 100 is optically transparent. Examples of the material of marker 100 include transparent resins such as polycarbonate, acrylic resin, cycloolefin polymer (COP), and cycloolefin copolymer (COC); and glass. The material of marker 100 is cycloolefin copolymer (COC) having refractive index nd of 1.54. Front surface 120 includes a plurality of convex surfaces 121. In addition, rear surface 140 includes a plurality of detection object parts 141.

Convex surfaces 121 are disposed at least along a first direction (the X direction in FIG. 1). Each convex surface 121 extends in a third direction (the Y direction in FIG. 1) perpendicular to the first direction and the height direction of marker 100 (a second direction, or the Z direction in FIG. 1). Convex surface 121 is a curved surface which has a curvature only in the first direction and includes ridgeline 122 linearly extending in the third direction. That is, marker 100 has a lenticular structure.

Two adjacent convex surfaces 121 in the plurality of convex surfaces 121 may be separated from each other, or may be disposed with no gap therebetween. In the present embodiment, two adjacent convex surfaces 121 of the plurality of convex surfaces 121 are disposed with no gap therebetween.

Convex surfaces 121 have the same size. For example, curvature radius R of one convex surface 121 is 246 µm, and the focal length of one convex surface 121 is 460 µm. Width W1 (length in the first direction) of one convex surface 121 is equal to pitch $P_{CL}$ of convex surfaces 121. The term "pitch" is the distance between ridgelines 122 (optical axes LA or central axes CA) of convex surfaces 121 adjacent to each other in the first direction, and is also the length (width) of convex surface 121 in the first direction. The term "optical axis LA of convex surface 121" or "central axis CA of convex surface 121" is a straight line passing through the center of convex surface 121, and extending along the second direction (the Z direction in FIG. 1) perpendicular to the first direction and the third direction in plan view of convex surface 121.

In a cross-section in the second direction (height direction) including a straight line extending along the first direction, the shape of convex surface 121 may be a curve or an arc. The term "curve" means a curve other than an arc, and is, for example, a curve composed of arcs having different curvature radiuses R. Preferably, in the present embodiment, the curve is a curve whose curvature radius R increases in the direction away from ridgeline 122 of convex surface 121.

Detection object parts 141 are disposed opposite to respective convex surfaces 121, and are projected onto respective convex surfaces 121 in the form of optically detectable images. Detection object parts 141 are disposed along the third direction in plan view of marker 100. As described above, the configuration of detection object parts 141 is not limited as long as detection object parts 141 are projected onto respective convex surfaces 121 in the form of optically detectable images. For example, detection object part 141 may be a recess, or a protrusion. In the present embodiment, detection object part 141 is a recess. The shape of the recess is not limited as long as a predetermined width is obtained in plan view of marker 100. In addition, coating film 142 formed by applying a coating material may be disposed in the recess. In the present embodiment, in plan view, detection object part 141 has a rectangular shape elongated in the third direction. It is to be noted that the height (position) of detection object part 141 in the height direction (the second direction) is a main feature of the present invention, and is therefore elaborated later.

In addition, the depth of the recess for forming detection object part 141 is not limited as long as the ease of application of the coating material and a desired function (image indication) can be ensured. For example, the depth of the recess for forming detection object part 141 may be 10 to 100 µm. The smaller the width W2 of detection object part 141 with respect to $P_{CL}$, the greater the viewing sensitivity, with respect to the angle, of the image to be viewed on convex surface 121 side. In addition, the greater the width W2 of the detection object part 141 with respect to $P_{CL}$, the greater the ease of the production of detection object part 141. Preferably, the ratio of width W2 of detection object part 141 to pitch $P_{CL}$ (W2/$P_{CL}$) is 1/100 to 1/5 in view of obtaining a sufficiently clear image.

Detection object part 141 is disposed at a position where the image of detection object part 141 appears at a center portion of convex surface 121 when marker 100 is viewed from front surface 120 side at the center of convex surface 121 in the first direction and the third direction.

For example, in the first direction, detection object part 141 corresponding to convex surface 121 located at the center of front surface 120 (convex surface 121 of n=0 in FIG. 1B) is disposed such that center $C_0$ thereof overlaps central axis CA of convex surface 121 of n=0.

The center-to-center distance ($|C_n - C_{n-1}|$) of detection object parts 141 corresponding to two convex surfaces 121 adjacent to each other in the first direction is represented by $P_{CL}$+nG (µm). As described above, $P_{CL}$ is the distance between of ridgelines 122 of two convex surfaces 121 adjacent to each other in the first direction. In addition, G is a predetermined distance from $P_{CL}$ in the first direction for ensuring an optical effect of images. Further, n represents an order of a certain convex surface 121 with respect to 0th convex surface 121 located at the center in the first direction.

With this configuration, in the first direction, detection object parts 141 corresponding to convex surfaces 121 other than convex surface 121 located at the center (n=0) are disposed outside central axes CA of respective convex surfaces 121.

Coating film 142 is formed in detection object part 141. Coating film 142 is a solidified black liquid coating material, for example.

Coating film 142 is produced through application and solidification of a coating material. The black liquid coating material has fluidity, and is a liquid composition or powder. The method of applying or solidifying the coating material may be appropriately selected from publicly known methods in accordance with the coating material. Examples of the application method of the black liquid coating material include spray coating and screen printing. In addition, examples of the solidification method of the black liquid coating material include drying of a black liquid coating material, curing of a curable composition (such as radical polymerizable compound) in a black liquid coating material, and baking of powder.

Coating film 142 forms an optically discriminable portion. The term "optically discriminable" means that coating film 142 and another portion are evidently different in their optical characteristics. The term "optical characteristics" means, for example, the degrees of the color such as brightness, saturation and hue, or the optical intensity such as luminance. The "difference" may be appropriately set in accordance with the use of the marker, and may be a difference which can be visually checked, or a difference which can be confirmed with an optical detection apparatus, for example. In addition, the "difference" may be a difference which can be directly detected from coating film 142, or a difference which can be detected through an additional operation such as irradiation of an UV lamp as in the case where coating film 142 is a transparent film that emits fluorescence, for example.

When marker 100 is placed on a white object, light which is incident on detection object part 141 through convex surface 121 is absorbed by coating film 142, whereas light which is incident on other portions through convex surface 121 is generally reflected by the surface of the object. As a result, an image of a line of a color (black) of coating film 142 is projected on convex surface 112 with a white background.

Since detection object parts 141 are appropriately disposed in accordance with their distances from the center of marker 100 in the first direction, a black collective image of black line images is observed when marker 100 is observed from front surface 120 side.

For example, when marker 100 is viewed from the center in the first direction, the black collective image is observed at a center portion in the first direction. When marker 100 is observed at a different angle in the first direction, the collective image is observed at a different position according to the angle in the first direction. That is, the angle of the observation position of marker 100 is determined based on the position of the collective image in the first direction.

Figure 2:
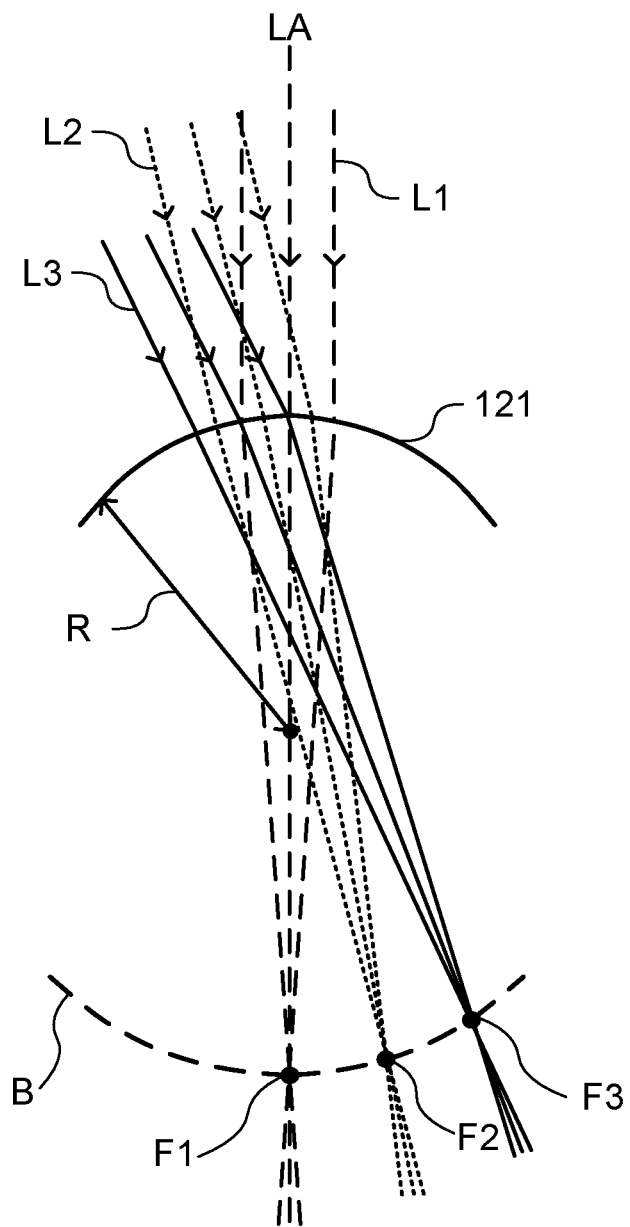
FIG. 2 describes field curvature.
Figure 3:
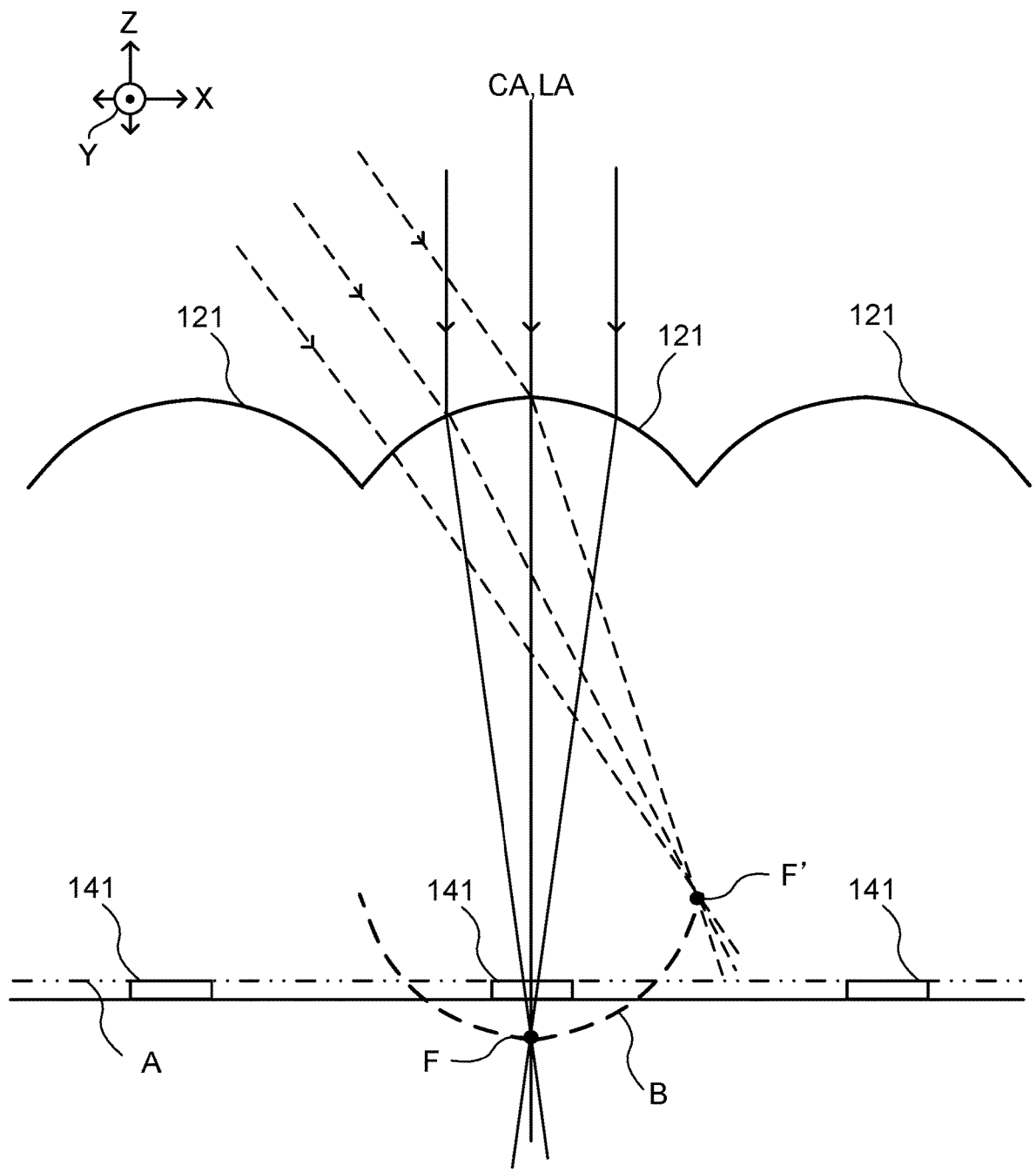
FIG. 3 describes the position of a detection object part in the height direction.
Figure 4:
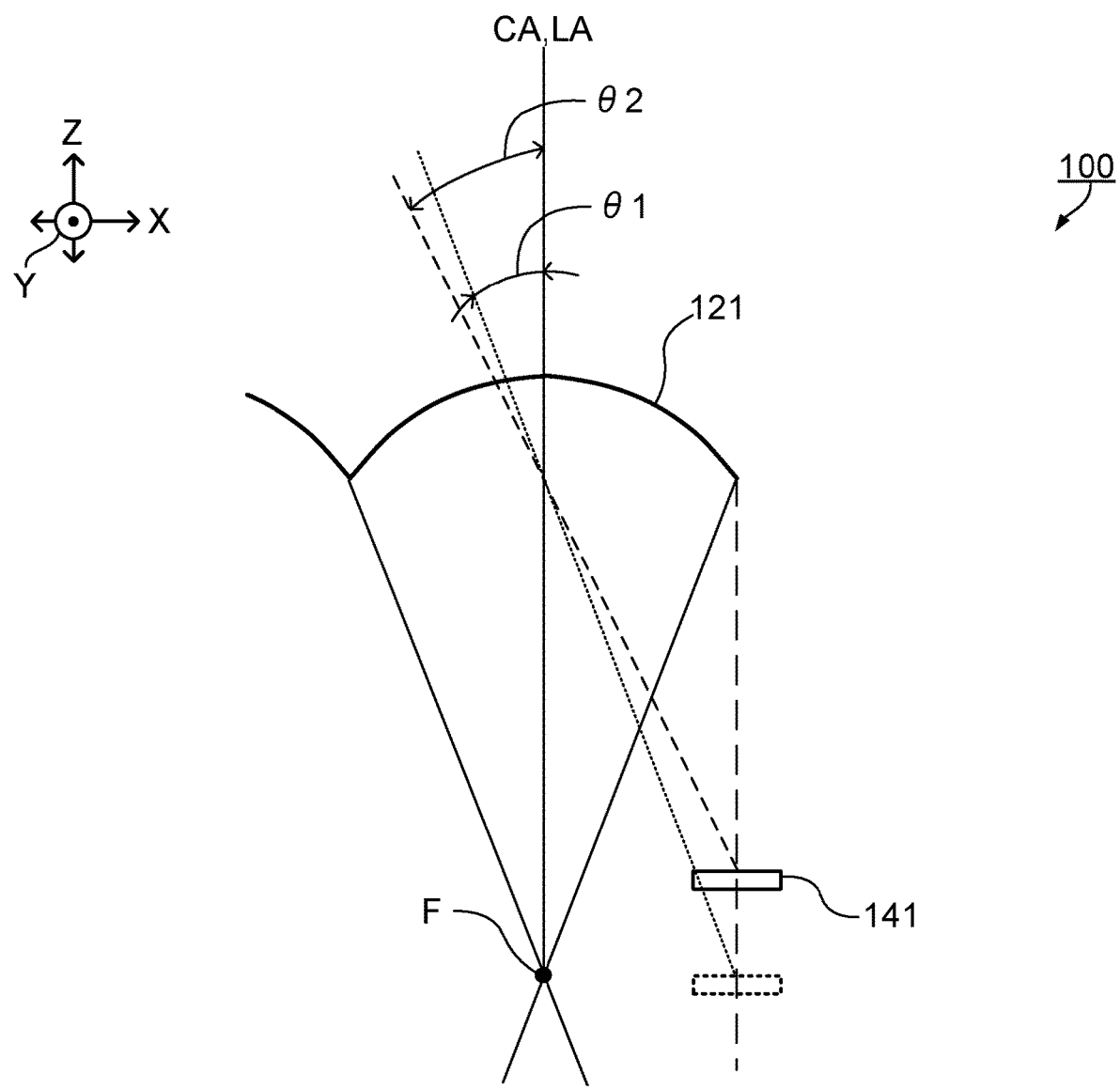
FIG. 4 describes an operation of the marker.

Now the position (height) of detection object part 141 in the height direction (the second direction) is described. FIG. 2 describes field curvature. FIG. 3 describes the position of detection object part 141 in the height direction. FIG. 4 describes an operation of marker 100.

It is generally known that a convex surface composed of a curved surface like convex surface 121 of marker 100 causes field curvature. Field curvature is caused in all optical systems that operate on a principle of using a positive lens like convex surface 121 to focus light. As illustrated in FIG. 2, when light beam L1 that is parallel to optical axis LA of convex surface 121 is incident on convex surface 121, light beam L1 focuses at focal point F of convex surface 121. Meanwhile, light beams L2 and L3 inclined with respect to light axis LA (light beam L1) focus at positions (see F2 and F3) on convex surface 121 side relative to focal point F in the height direction. Field curvature refers to an optical aberration in which, in a single convex surface, the focal point (height) of a light beam incident on convex surface 121 differs depending on the inclination angle of the light beam. The plane including the focal points of light beams is image plane B. Image plane B of the convex surface of marker 100 has a substantially U-shaped groove shape extending along the third direction. That is, image plane B is defined by an optical unit including one convex surface, and in marker 100, image plane B is represented by a plane having a width of one convex surface 121 with focal point F at its center in the first direction.

In addition, in general, field curvature is calculated based on the value in air (air conversion length). Accordingly, here, field curvature is basically represented by an air conversion length. It is to be noted that, practically, the actual thickness of the marker is determined based on the refractive index of the material.

Marker 100 can achieve downsizing and a wide observation angle by utilizing field curvature. To be more specific, as illustrated in FIG. 3, the bottom of each detection object part 141 is located on convex surface 121 side relative to focal point F of convex surface 121. Focal point F is the remotest point from convex surface 121 in image plane B curved by field curvature of the convex surface 121. In addition, the bottom of detection object part 141 is disposed on one virtual plane (virtual flat plane) perpendicular to the height direction of marker 100. As is generally known, the term "focal point F" is a point where a light beam (light flux) parallel to light axis LA incident on convex surface 121 intersects light axis LA, and is a point that is calculated based on the focal length of the first surface (lens).

In addition, preferably, virtual plane A is remote from convex surface 121 relative to point (F') closest to convex surface 121 in image plane B curved by field curvature of each convex surfaces 121. More preferably, virtual plane A is located on convex surface 121 side relative to focal point F of convex surfaces 121 by a length equal to or greater than 5% of the focal length of convex surface 121 on light axis LA of convex surface 121. In the present embodiment, the focal length is 460 μm as described above, and accordingly 5% of the focal length is 23 μm. In the present embodiment, for example, virtual plane A is located 50 μm from focal point F on convex surface 121 side. If virtual plane A is located on convex surface 121 side relative to the point closest to each convex surface 121 in image plane B curved by field curvature of each convex surfaces 121, a black collective image might not be appropriately observed.

In FIG. 4, in the first direction (the X direction), the end portion of convex surface 121 and detection object part 141 are disposed at the same position. As illustrated in FIG. 4, in the case where the front surface (detecting position) of detection object part 141 is located at the same height as focal point F, detection object part 141 can be observed when the angle to light axis LA is within the range of θ1. On the other hand, in the case where the front surface (detecting position) of detection object part 141 is located on convex surface 121 side relative to focal point F of convex surface 121 in the height direction, detection object part 141 can be observed when the angle to light axis LA is within the range of θ2. That is, in the case where detection object part 141 is located on convex surface 121 side relative to focal point F of convex surface 121, detection object part 141 can be observed even when the angle to light axis LA is large. That is, marker 100 can achieve a wider detection angle in comparison with a marker in which detection object part 141 is disposed on focal point F of convex surface 121 in the first direction.

In addition, also in the third direction (the depth direction in FIG. 4), in the case where detection object part 141 is disposed on convex surface 121 side relative to focal point F of convex surface 121, detection object part 141 can be observed even when the angle to light axis LA is large. That is, a wide detection angle of marker 100 can be achieved also in the third direction.

Simulation

Next, a relationship between the spot diagram and the position of detection object part 141 in the height direction was examined. In this simulation, convex surface 221 of marker 200 according to Embodiment 2 was used. Convex surface 221 of marker 200 has a predetermined curvature in the first direction and the third direction. In this simulation, as light beams incident on convex surface 221, light beam L4 that is parallel to light axis LA, light beam L5 whose inclination angle to light axis LA is 13°, and light beam L6 whose inclination angle to light axis LA is 26° were used. In addition, the position (height) of detection object part 241 in the height direction was set to height h1 that is equal to that of the focal point of convex surface 221, height h2 that is 50 μm from the focal point of convex surface 221 on convex surface 221 side, and height h3 that is 50 μm from the focal point of convex surface 221 on the side opposite to convex surface 221. Height h2 in the present simulation is within the above-described range of the preferable height of virtual plane A (a position on convex surface 121 side relative to focal point F by a length equal to or greater than 5% of the focal length of convex surface 121).

Figure 5:
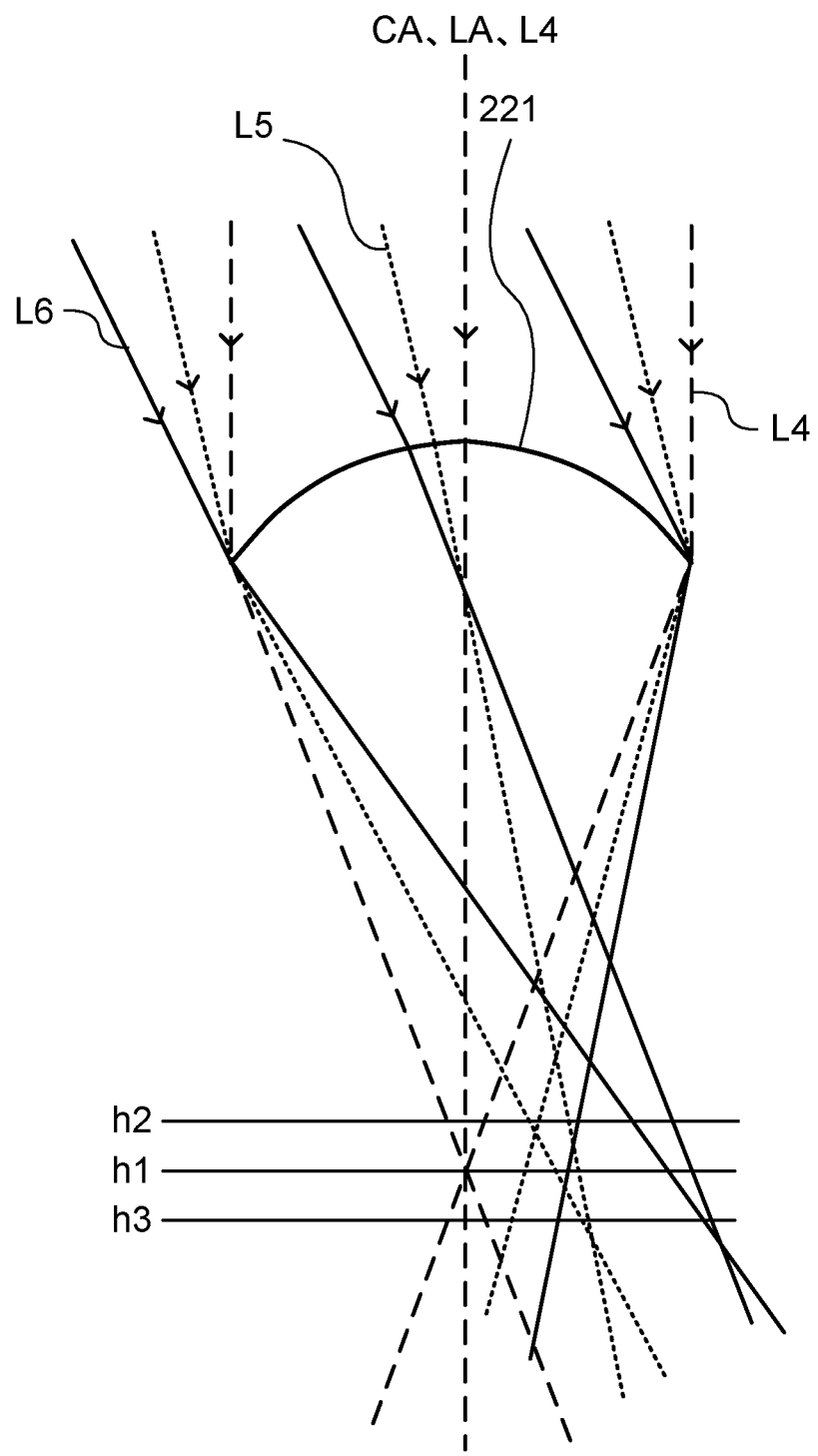
FIG. 5 describes a condition of a simulation.

FIG. 5 illustrates light beam paths for describing the position of detection object part 241 in the height direction. FIGS. 6A to 6I are spot diagrams of respective positions. FIG. 6A is a spot diagram of light beam L4 at height h2, FIG. 6B is a spot diagram of light beam L5 at height h2, FIG. 6C is a spot diagram of light beam L6 at height h2, FIG. 6D is a spot diagram of light beam L4 at height h1, FIG. 6E is a spot diagram of light beam L5 at height h1, FIG. 6F is a spot diagram of light beam L6 at height h1, FIG. 6G is a spot diagram of light beam L4 at height h3, FIG. 6H is a spot diagram of light beam L5 at height h3, and FIG. 6I is a spot diagram of light beam L6 at height h3. It is to be noted that FIG. 5 illustrates only two light beams passing through both ends of convex surface 221, and light beams passing through the middle point between the two straight lines.

It was confirmed that, as illustrated in FIG. 5 and FIGS. 6D to 6F, when detection object part 241 is located at height h1 that is equal to that of the focal point of convex surface 221, the area (width) of the light flux of light beam L4, which is parallel to light axis LA, on light axis LA is minimized as intended. In addition, it was confirmed that the greater the angle to light axis LA by field curvature and/or other aberrations, the greater the outer diameter of the spot of light beam L5 and light beam L6. In addition, it was confirmed that, as illustrated in FIG. 5 and FIGS. 6G to 6I, in the case where detection object part 241 is located at height h3 that is 50 μm from the focal point of convex surface 221 on the side opposite to convex surface 221, the greater the angle to optical axes LA of light beam L4, light beam L5 and light beam L6, the greater the outer diameter of the spot. On the other hand, as illustrated in FIG. 5 and FIGS. 6A to 6C, in the case where detection object part 241 is located at height h2 that is 50 μm from the focal point of convex surface 221 on convex surface 221 side, the outer diameters of the spots of light beam L4, light beam L5 and light beam L6 are almost the same regardless of the angle to light axis LA. This means that, in the present invention, the position of detection object part 241 is located on convex surface 221 side relative to the focal point, and accordingly variation of the visibility of black collective image depending on the observation angle is reduced in comparison with the case where detection object part 241 is located at the same height as the focal point.

It is to be noted that, when the present simulation is conducted with convex surface 121 of marker 100, spot diagrams corresponding to the spot diagrams of FIGS. 6A to 6I extend only in the vertical direction of FIG. 6. The reason for this is that convex surface 121 of marker 100 according to Embodiment 1 has a curvature only in the first direction. Further, it was confirmed that, as with convex surface 221 of marker 200 according to Embodiment 2, in the case where detection object part 141 is located at height h1 same as the focal point of convex surface 121, light beam L4 that is parallel to light axis LA focuses at the focal point. In addition, regarding light beam L5 and light beam L6, the greater the angle to light axis LA by field curvature and/or other aberrations, the greater the distance of dispersion of spots. In addition, in the case where detection object part 141 is located at height h3 that is 50 μm from the focal point of convex surface 121 on the side opposite to convex surface 121 side, the greater the angle to optical axes LA of light beam L4, light beam L5 and light beam L6, the greater the distance of dispersion of spots. On the other hand, in the case where detection object part 141 is located at height h2 that is 50 μm from the focal point of convex surface 121 on convex surface 121 side, the distances of dispersion of the spots of light beam L4, light beam L5 and light beam L6 are almost the same regardless of the angle to light axis LA.

As described above, in marker 100 in which detection object part 141 is disposed on convex surface 121 side relative to the focal point of convex surface 121, light beams (light fluxes) incident on convex surface 121 in a range of predetermined inclination angles focus with spot diameters similar to one another. With this configuration, detection object parts 141 are most stably observed in the form of a black collective image when the inclination angle to light axis LA is within a predetermined angle range. Further, within another angle range wider than the above-mentioned predetermined angle range by a predetermined angle, a black collective image can be observed. Thus, marker 100 in which detection object part 141 is disposed on convex surface 121 side relative to the focal point of convex surface 121 can achieve a wider detection angle. Detection object part 141 is disposed within the range of the focal point height of convex surface 121 that changes within a predetermined angle range. Accordingly, light is brought into focus at detection object part 141 at least at one point in a predetermined angle range.

Figure 7:
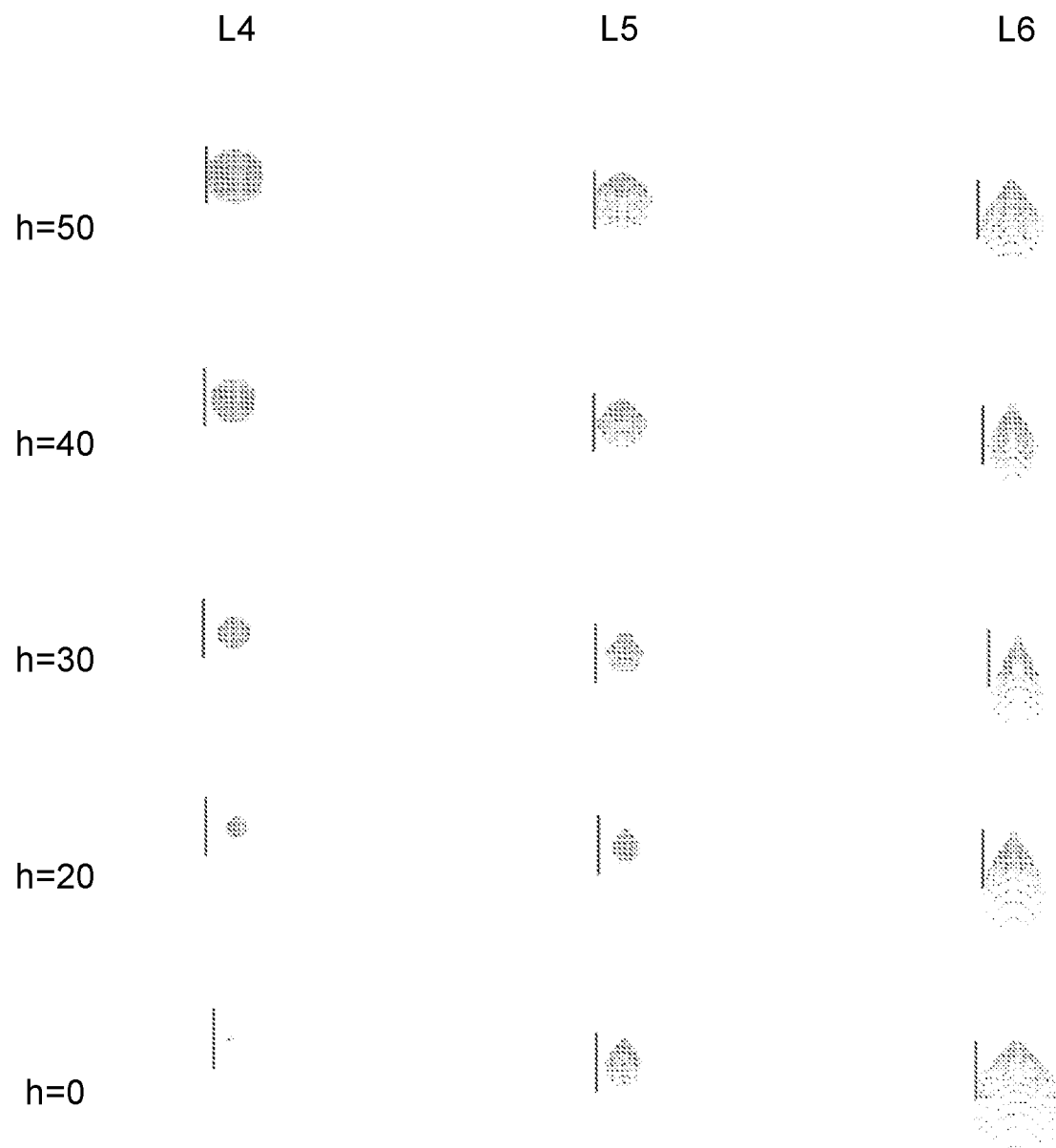
FIG. 7 illustrates spot diagrams obtained by a simulation in a range from the height of focal point F to the height of a point closest to the convex surface in the field curvature.

FIG. 7 illustrates spot diagrams obtained by a simulation under the condition same as that of the above-mentioned simulation in a range from the height of focal point F (h=0 μm) to the height of point F' (h=53 μm) closest to the convex surface in the field curvature. In FIG. 7, "h" indicates a distance (height, μm) from focal point F to the convex surface side in the second direction, and "L4," "L5," and "L6" indicate the light beams. In addition, in the drawing, a line equal to the spot length of h=50 and L4 is shown alongside each spot for the purpose of comparison of the spot size. For example, in FIG. 7, the three spot diagrams of h=0 are identical to the corresponding parts of FIGS. 6D to 6F except in their spot orientations. It is to be noted that "h" is shown in air conversion length.

As described above, in the case where the detection object part is located at the same height as focal point F, the area (width) of the light flux on light axis LA is minimized, and the outer diameter of the spot increases as the angle of the light beam to optical axis LA increases. At a position 30 μm from focal point F (h=30), the actual spot size of L6 is reduced to a size equal to or smaller than +20% of the actual spot size of L4 (the size of the dense portion in FIG. 7). The greater the distance h from focal point F, the smaller the difference in actual sizes among the spots corresponding to L4, L5, and L6. Meanwhile, the greater the distance h from focal point F, the lower the density of the spot of L6 relative to the density of the spots of L4.

In addition, Table 1 shows the value of h in the simulation, the corresponding thickness T of the lens, maximum value θ2 of the detection angle in the range of h, and difference Δθ (θ2−θ2s) between the maximum value θ2 and maximum value θ2s(26.4°) of the detection angle at the height of focal point F. It is to be noted that thickness T of the lens is the distance between the convex surface of the lens and the top surface of the detection object part in the second direction.

TABLE 1

| h (μm) | T (mm) | θ2 (°) | Δθ (°) |
|---|---|---|---|
| 53 | 0.620 | 30.5 | 4.1 |
| 52 | 0.622 | 30.4 | 4.0 |
| 50 | 0.625 | 30.2 | 3.8 |
| 47 | 0.630 | 29.9 | 3.5 |
| 45 | 0.633 | 29.8 | 3.4 |
| 41 | 0.639 | 29.4 | 3.0 |
| 40 | 0.640 | 29.3 | 2.9 |
| 36 | 0.647 | 29.0 | 2.6 |
| 35 | 0.648 | 28.9 | 2.5 |
| 30 | 0.656 | 28.5 | 2.1 |
| 28 | 0.659 | 28.4 | 2.0 |
| 25 | 0.664 | 28.2 | 1.8 |
| 20 | 0.671 | 27.8 | 1.4 |
| 10 | 0.687 | 27.1 | 0.7 |
| 0 | 0.702 | 26.4 | 0 |

As is clear from Table 1, maximum value θ2 of the detection angle can be increased by 2.0° or greater when h is 28 μm or greater, by 2.5° or greater when h is 35 μm or greater, by 3.0° or greater when h is 41 μm or greater, and by 3.5° or greater when h is 47 μm or greater, in comparison with that of the height of focal point F. In addition, the maximum value of the detection angle can be set to 110% or greater of maximum value θ2s of the detection angle at the height of focal point F when h is 36 μm or greater, and to 115% or greater of 02s when h is 52 μm or greater.

It is to be noted that, the position of focal point F in the marker can be determined based on the refractive index and the curvature radius of the convex surface, and distance hg (the maximum value of h) from the height of focal point F of convex surface to the height of the maximum position of (F') in the field curvature can be calculated based on publicly known methods. For example, hg can be calculated based on expression (4.34) and expression (4.37) in "BASIC OPTICS FOR USER ENGINEER" Toshirou Kishikawa (Optronics Co., Ltd) (pp. 106-107). In addition, maximum value θ2 of the detection angle can be calculated based on the hg and the structure of one optical unit in the marker. In addition, the air conversion length can be calculated based on expression (2.44) and expression (2.45) in the above-mentioned reference book.

Accordingly, the position of the detection object part in the second direction in the marker can be appropriately set in accordance with various factors such as the image size, the image clearness, and the detection range. While the position of the detection object part may be set based only on the simulation results, the position of the detection object part may also be appropriately set in consideration of other factors such as the sense of the user who detects the image, the sensitivity of the detection device, and aberrations other than field curvature, as well as the simulation results.

For example, in view of equalizing the sizes of the images of the detection object parts to be projected onto the convex surfaces, it is preferable to set the positions of the detection object parts in the second direction to a high position as much as possible. Preferably, the position of the detection object part in the second direction is 0.55 hg or greater from focal point F, more preferably, 0.75 hg or greater from focal point F, yet more preferably 0.94 hg or greater from focal point F. When the position of the detection object part is 0.55 hg or greater, the size of the image of the detection object part can be set to a size falling within 120% of the clearest image of the detection object part located at the height of focal point F. When the position of the detection object part is 0.75 hg or greater, the sizes of the images of the detection object parts can be essentially equalized.

In addition, preferably, in view of increasing the clearness of the image of the detection object part, the position of the detection object part is smaller than a certain value. For example, preferably, the position of the detection object part is 0.9 hg or smaller, more preferably 0.85 hg or smaller, yet more preferably 0.8 hg or smaller, yet more preferably, 0.75 hg or smaller. In addition, preferably, in view of simultaneously achieving the clearness and the size of the image of the detection object part, the position of the detection object part is 0.66 hg to 0.85 hg, more preferably 0.7 hg to 0.8 hg.

In addition, preferably, in view of increasing detection angle θ2, the position of the detection object part is 0.53 hg or greater, more preferably 0.66 hg or greater, yet more preferably 0.77 hg or greater, yet more preferably 0.89 hg or greater. When the position of the detection object part is 0.53 hg, maximum value θ2 of the detection angle can be increased by 2.0° or greater in comparison with θ2s. When the position of the detection object part is 0.66 hg or greater, maximum value θ2 of the detection angle can be increased by 2.5° or greater in comparison with θ2s. When the position of the detection object part is 0.77 hg or greater, maximum value θ2 of the detection angle can be increased by 3.0° or greater in comparison with θ2s. When the position of the detection object part is 0.89 hg or greater, maximum value θ2 of the detection angle can be increased by 3.5° or greater in comparison with θ2s.

Alternatively, preferably, the position of the detection object part is 0.68 hg or greater, more preferably 0.98 hg or greater from the above-mentioned viewpoints. When the position of the detection object part is 0.68 hg or greater, θ2 can be set to 110% or greater of θ2s, and when the position of detection object part is 0.98 hg or greater, θ2 can be set to 115% or greater of θ2s.

Effect

As described above, in marker 100, detection object part 141 located on convex surface 121 side relative to focal point F of convex surface 121 in the height direction. Thus, marker 100 can achieve downsizing in the height (thickness) direction of marker 100, and can achieve a wide detection angle.

Embodiment 2

Marker 200 according to Embodiment 2 differs from marker 100 according to Embodiment 1 only in configurations of convex surface 221 and detection object part 241. In view of this, the components identical to those of marker 100 will be denoted with the same reference numerals, and the description thereof will be omitted.

Figure 8A:
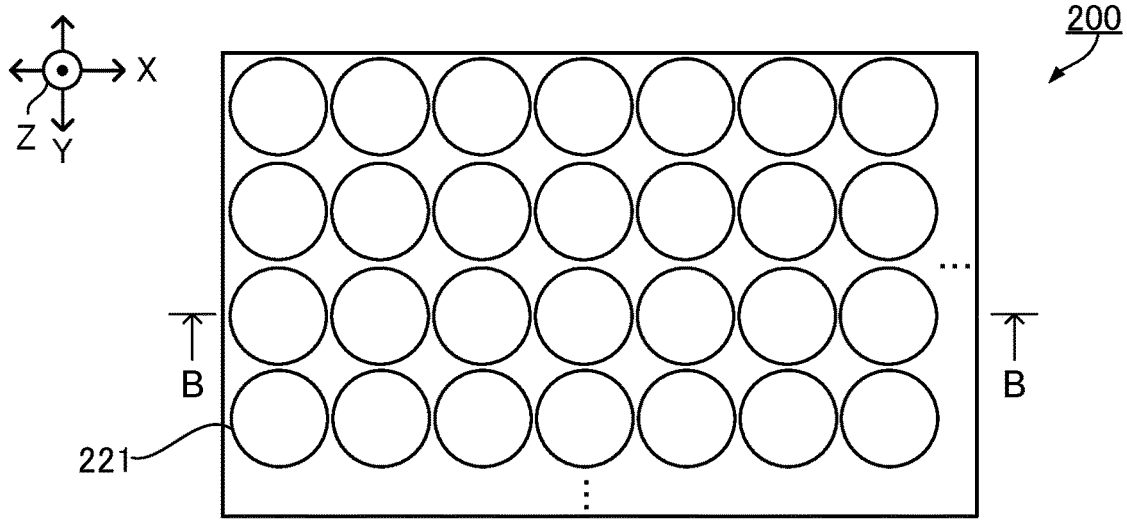
FIGS. 8A to 8C schematically illustrate a configuration of a marker according to Embodiment 2 of the present invention.
Figure 8B:
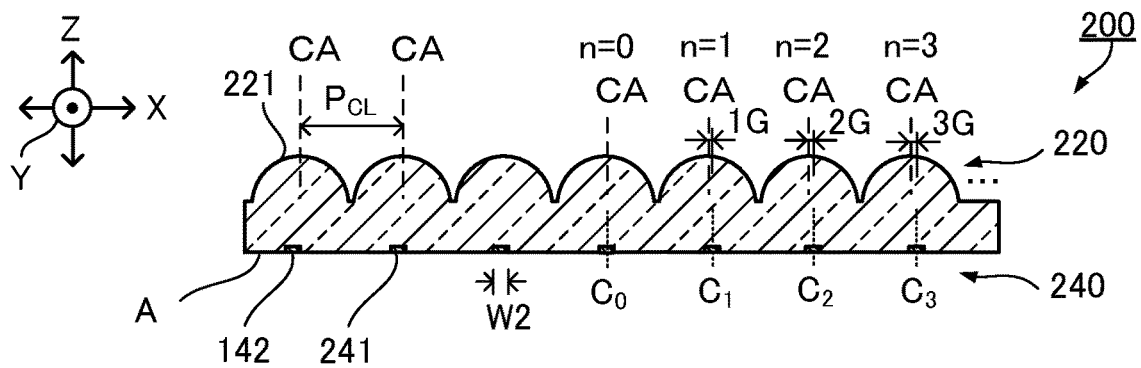
Figure 8C:
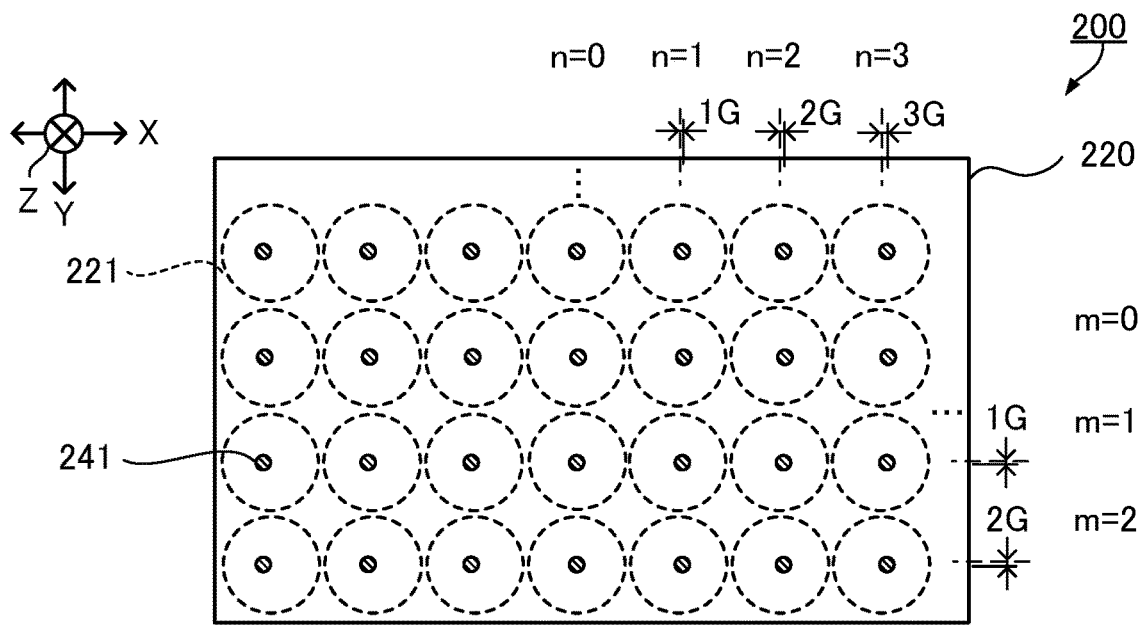

FIGS. 8A to 8C illustrate a configuration of marker 200. FIG. 8A is a plan view schematically illustrating a configuration of marker 200, FIG. 8B schematically illustrates a cross section of marker 200 taken along line B-B of FIG. 8A, and FIG. 8C is a bottom view schematically illustrating a configuration of marker 200.

As illustrated in FIGS. 8A to 8C, marker 200 includes front surface (first surface) 220, and rear surface (second surface) 240. Front surface 220 includes a plurality of convex surfaces 221. In addition, rear surface 240 includes a plurality of detection object parts 241.

In plan view, each convex surface 221 has a circular shape, and has the same size. For example, the diameter of the shape of convex surface 221 in plan view is 350 μm, and pitch $P_{CL}$ of convex surfaces 221 is 370 μm in the first direction and the third direction. The term "pitch" means the center-to-center distance of convex surfaces 221 adjacent to each other.

In a cross section including a straight line extending along the first direction and a straight line extending along the second direction, the shape of convex surface 221 may be a curve, or an arc. It is to be noted that, in the present embodiment, the cross-sectional shape of convex surface 221 is a curve. In addition, in the present embodiment, the curve is a curve whose curvature radius increases as the distance from central axis CA of convex surface 221 increases. That is, in the present embodiment, convex surface 221 has a shape of an aspherical surface. In addition, central axis CA of convex surface 221 is a straight line that is parallel to the second direction, and accordingly the aspherical surface is a curved surface whose curvature radius increases as the distance from central axis CA of convex surface 221 increases. The term "central axis CA of convex surface 221" or "optical axis LA of convex surface 221" means a straight line that extends along the second direction and passes through the center of convex surface 221 in plan view of marker 200.

In plan view, detection object part 241 has a circular shape. In addition, the cross-sectional shape of detection object part 241 is rectangular in the first direction and the third direction.

The center-to-center distance ($|C_n-C_{n-1}|$) of detection object parts 241 adjacent to each other in the first direction is $P_{CL}$+nG (μm), and the center-to-center distance ($|C_m-C_{m-1}|$) of detection object parts 241 adjacent to each other in the third direction is $P_{CL}$+mG (μm). As described above, n represents an order of a certain convex surface 221 with respect to 0th convex surface 221 in the second direction. The "m" represents an order of a certain convex surface 221 with respect to 0th convex surface 221 in the third direction.

In the present embodiment, "image plane" is defined by an optical unit including one convex surface 221. That is, the image plane is a convex surface protruding to the side opposite to convex surface 221 with the focal point of convex surface 221 at its center, and has a planar shape of a piece of a grid (rectangular) including one convex surface 221. The piece of a grid is a rectangular part enclosed with lines connecting the middle points (equidistant points) of convex surfaces 221 adjacent to one another in the extending directions (the X direction and the Y direction). In the present embodiment, one optical unit is represented by a region having a substantially rectangular prism shape including one convex surface 221 as its top surface, and having the above-mentioned grid planar shape corresponding to the top surface. In this optical unit, the highest point (F') in the field curvature is located at a corner of a rectangle of the optical unit as viewed in plan view. Each detection object part 241 is located on one plane on convex surface 221 side relative to the focal point in the second direction, or more preferably, each detection object part 241 is located on one plane between the focal point and the peripheral end of the image plane in the second direction.

When marker 200 is observed from convex surface 221 side, a collective image that is composed of images of black points of detection object parts 241 projected on convex surfaces 221 is observed. The position of the collective image changes depending on the viewing angle from convex surface 221 side. With this configuration, marker 200 is used as a turning-angle marker in which an image moves in the plane direction in accordance with the viewing angle.

It is to be noted that the shape of convex surface 221 in plan view may be a rectangular shape as well as the circular shape, and may be appropriately set as long as the function of the convex lens can be ensured. Also, the shape of detection object parts 241 in plan view may be a shape other than the circular shape, and may be a rectangular shape, for example.

Results of the simulation with convex surface 221 of marker 200 are as described above.

Effect

Accordingly, marker 200 has an effect similar to that of marker 100.

While detection object parts 141 corresponding to convex surfaces 121 other than convex surface 121 located at the center (n=0) are disposed outside central axes CA of respective convex surfaces 121 in the first direction in Embodiment 1, the detection object parts 141 may be disposed inside central axes CA of respective convex surfaces 121 in the first direction.

While detection object parts 241 corresponding to convex surfaces 221 other than convex surface 221 located at the center (n=0) are disposed outside central axes CA of respective convex surfaces 221 in the first direction and the third direction in Embodiment 2, the detection object parts 241 may be disposed inside central axes CA of respective convex surfaces 121 in the first direction and the third direction.

While each of detection object parts 141 and 241 are composed of a recess in Embodiments 1 and 2, detection object parts 141 and 241 may be composed of protrusions. In this case, coating film 142 may be formed on the top surface of the protrusion. In addition, coating film 142 in Embodiments 1 and 2 may be a colored seal.

While coating film 142 is formed only in the recess in Embodiments 1 and 2, coating film 142 may be formed in the regions other than the recess as well as in the recess. In this case, the recess and the regions other than the recess may be coating films and/or seals of different colors. Further, each of detection object parts 141 and 241 may be a reflection surface composed of an irregularity of pyramidal minute prism, a metal-vapor deposited film and the like which is formed in the recess and/or the regions other than the recess.

Embodiment 3

The configuration of marker 300 according to Embodiment 3 differs from the configuration of marker 200 according to Embodiment 2 in shapes of convex surface 321, first region 341, and second region 342. In view of this, the components identical to those of marker 200 according to Embodiment 2 will be denoted with the same reference numerals, and the description thereof will be omitted.

Figure 9A:
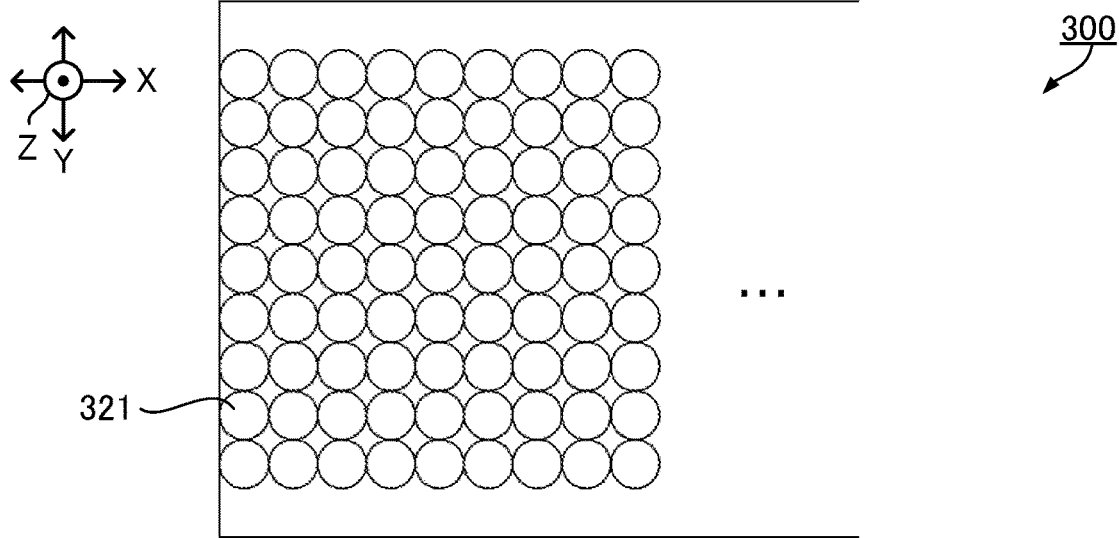
FIGS. 9A to 9C schematically illustrate a configuration of a marker according to Embodiment 3 of the present invention.
Figure 9B:
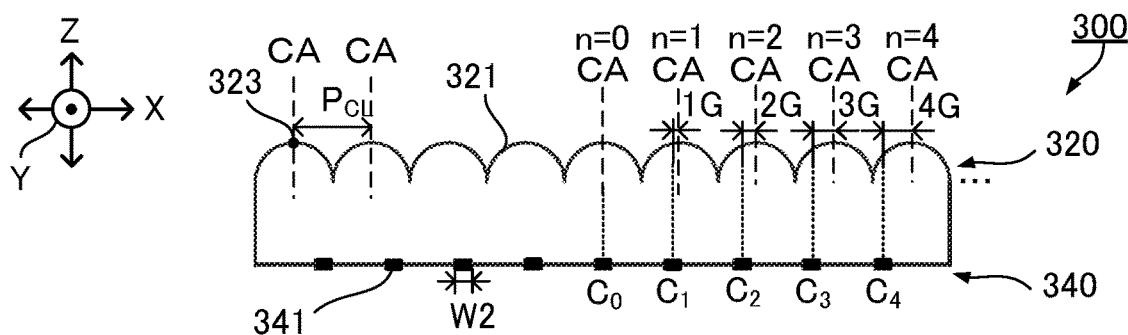
Figure 9C:
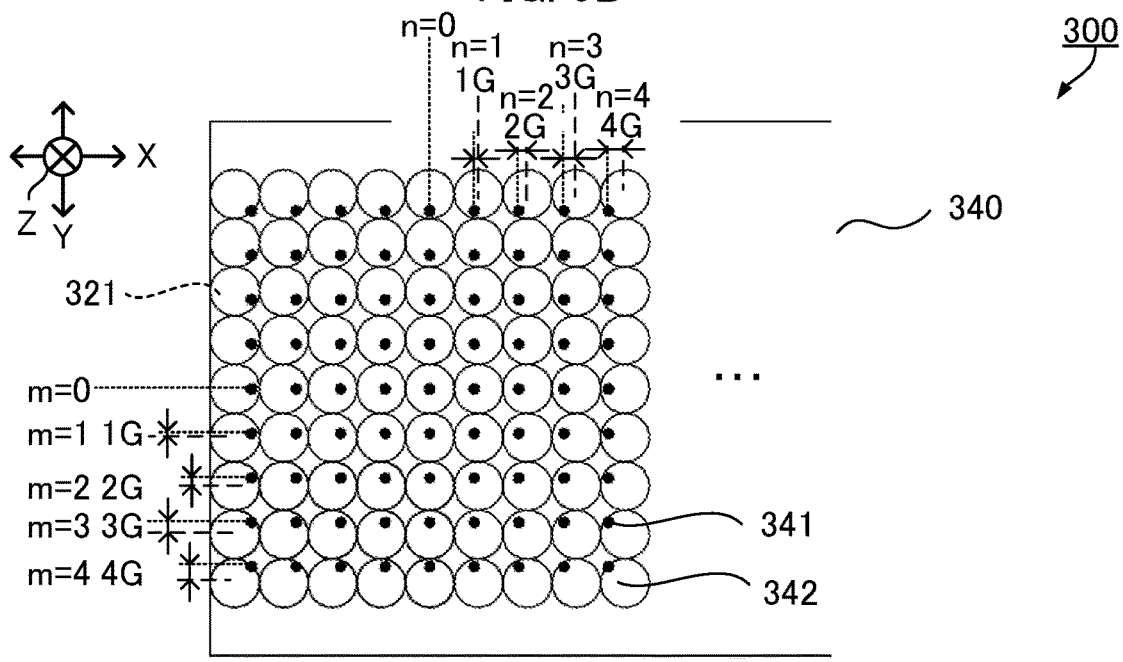

FIGS. 9A to 9C illustrate a configuration of marker 300. FIG. 9A is a plan view of marker 300, FIG. 9B is a partially enlarged sectional view of marker 300 in which hatching is omitted, and FIG. 9C is a bottom view of marker 300.

As illustrated in FIGS. 9A to 9C, marker 300 includes first surface 320 and second surface 340. First surface 320 includes a plurality of convex surfaces 321. In addition, second surface 340 includes a plurality of first regions 341, and a plurality of second regions 342.

In plan view, convex surfaces 321 have circular shapes, and the same size. For example, the diameter of the shape of convex surface 321 in plan view is 440 μm, and pitch $P_{CL}$ of convex surfaces 321 is 440 μm in the first direction (the X direction) and the third direction (the Y direction). The term "pitch of convex surfaces 321" means a distance between the centers (vertices 323 or central axes CA) of convex surfaces 321 adjacent to each other. In addition, the term "central axis CA of convex surface 321" means a straight line that passes through the center of convex surface 321, and extends along the second direction (the Z direction) in plan view of convex surface 321. Further, the term "vertex 323 of convex surface 321" is an intersection of convex surface 321 and central axis CA.

In a cross section of marker 300 in the height direction (the Z direction), each convex surface 321 has a substantially semicircular shape. That is, since central axis CA of convex surface 321 is a straight line that is parallel to the second direction (the Z direction), convex surface 321 is a substantially hemispherical surface. That is, convex surface 321 is rotationally symmetrical about central axis CA as the rotation axis. In addition, focal point F3 of convex surface 321 as viewed from convex surface 321 is located at a position farther than first region 341. In other words, first region (detection object part) 341 is disposed on convex surface 321 side relative to the focal point of front surface (first surface) 320.

In addition, marker 300 includes first region 341 disposed at a position corresponding to each convex surface 321 on the rear surface side of marker 300. For example, in plan view, first region 341 has a circular shape.

The center-to-center distance ($|C_n-C_{n-1}|$) of first regions 341 adjacent to each other in the first direction (the X direction) is $P_{CL}$–nG μm, and the center-to-center distance ($|C_m-C_{m-1}|$) of first regions 341 adjacent to each other in the third direction (the Y direction) is $P_{CL}$–mG μm. The "n" represents an order of a certain convex surface 321 with respect to 0th convex surface 321 in the first direction (the X direction). The "m" represents an order of a certain convex surface 321 with respect to 0th convex surface 321 in the third direction (the Y direction).

As described above, first regions 341 corresponding to convex surfaces 321 located at respective distances from the center (n=0) convex surface 321 in the first direction (the X direction) are located on the center (n=0) convex surface 321 side relative to central axes CA of respective convex surfaces 321 in the first direction (the X direction). In addition, first regions 341 corresponding to convex surfaces 321 located at respective distances from the center (m=0) convex surface 321 in third direction (the Y direction) are located on the center (n=0) convex surface 321 side relative to central axes CA of respective convex surfaces 321 in the third direction (the Y direction). That is, in the present embodiment, in the first direction (the X direction) and the third direction (the Y direction), the center-to-center distance of first regions 341 adjacent to each other is smaller than the distance between vertices 323 of convex surfaces 321 adjacent to each other. In addition, also in the present embodiment, at the height of first region 341 in a cross section including the first direction (the X direction) and the height direction (the Z direction), the width of the light flux formed by convex surface 321 is equal to or smaller than the width of first region 341.

In the present embodiment, first region 341 corresponds to a detection object part. In addition, second regions 342 are disposed adjacent to each other in the X direction and the Y direction. In the present embodiment, in plan view, the image plane has a shape enclosed by lines connecting equidistant points of second regions 342 adjacent to one another, that is, a square shape that circumscribes second region 342. In addition, in the present embodiment, the optical unit is a region having a substantially rectangular prism shape with the planar portion of second surface 340 as the bottom surface, and with convex surface 321 as the top surface. In this optical unit, the highest point (F') in the field curvature is located at a corner of a rectangle of the optical unit as viewed in plan view.

Although not illustrated in the drawings, also in marker 300, when the observation angle is changed, the image of first region 341 is observed in the form of one image. In marker 300, as the observation angle of marker 300 with respect to the optical axis is increased, the observed image moves in a direction toward the viewer.

Accordingly, marker 300 has an effect similar to those of markers 100 and 200.

Embodiment 4

The configuration of marker 400 according to Embodiment 4 differs from the configuration of marker 300 according to Embodiment 3 only in shape of convex surface 421. In view of this, the components identical to those of marker 300 will be denoted with the same reference numerals, and the description thereof will be omitted.

Figure 10A:
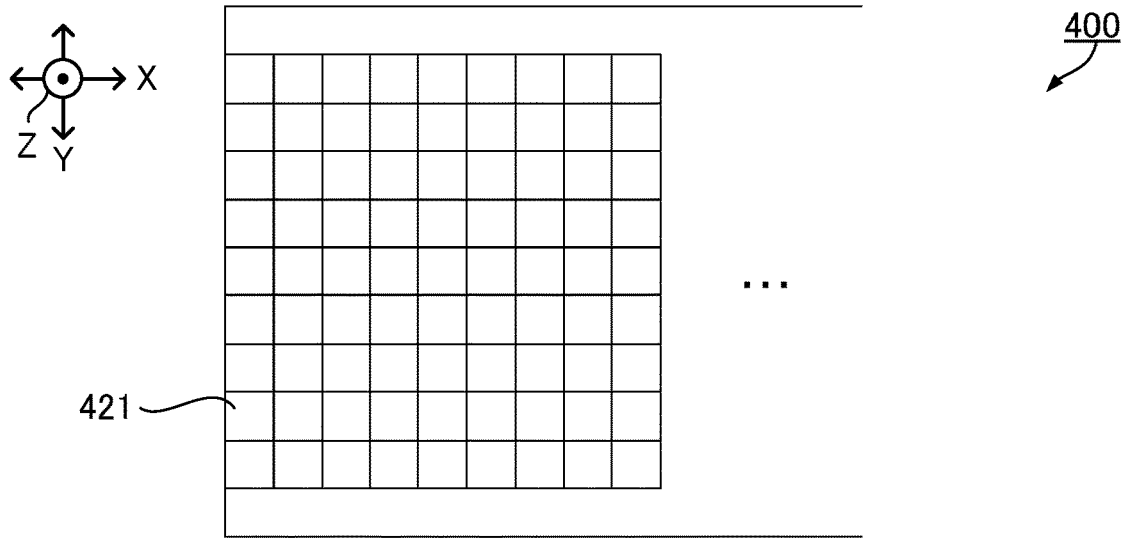
FIGS. 10A to 10C schematically illustrate a configuration of a marker according to Embodiment 4 of the present invention.
Figure 10B:
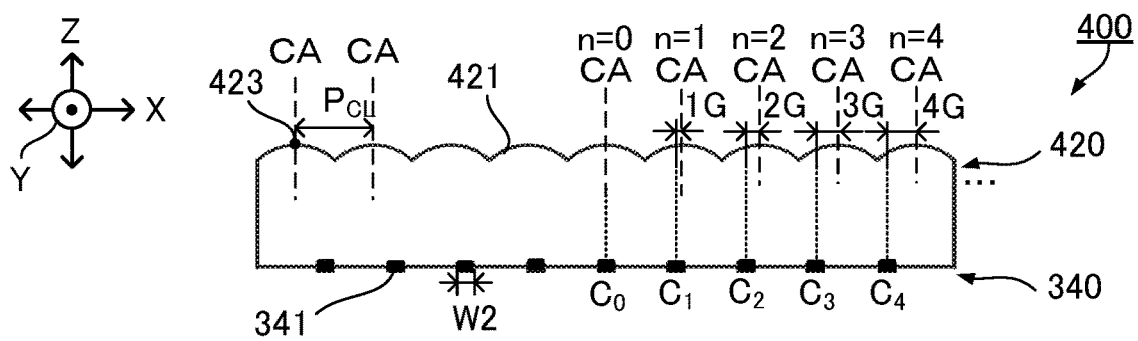
Figure 10C:
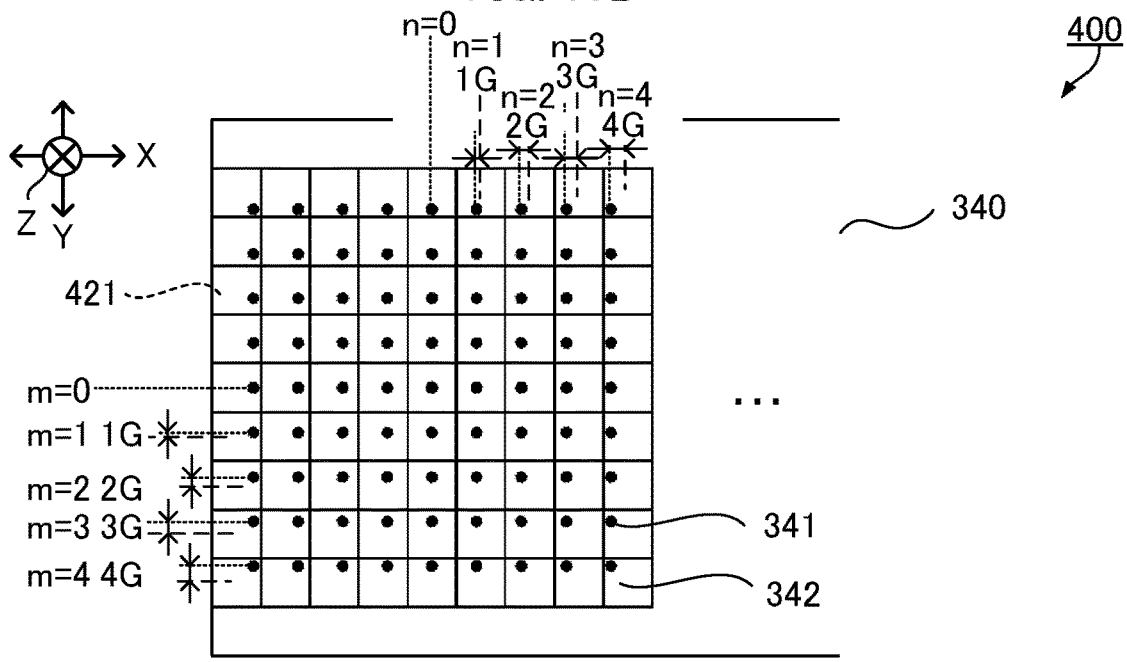

FIGS. 10A to 10C illustrate a configuration of marker 400. FIG. 10A is a plan view of marker 400, FIG. 10B is a partially enlarged sectional view of marker 400 in which hatching is omitted, and FIG. 10C is a bottom view of marker 400.

As illustrated in FIGS. 10A to 10C, marker 400 includes first surface 420 and second surface 340. First surface 420 includes a plurality of convex surfaces 421. In addition, second surface 340 includes a plurality of first regions 341 and a plurality of second regions 342. As in marker 300, first region (detection object part) 341 is disposed on convex surface 421 side relative to the focal point of front surface (first surface) 420.

In plan view, convex surfaces 421 have square shapes, and have the same size. In addition, for example, the length of one side of the shape of each convex surface 421 in plan view is equal to pitch $P_{CL}$ of convex surfaces 421 in the first direction and the third direction. The term "pitch of convex surface 421" means the distance between the centers (vertices 423 or central axes CA) of convex surfaces 421 adjacent to each other. In addition, "central axis CA of convex surface 421" means a line that passes through the center of convex surface 421 and extends along the second direction in plan view of convex surface 421. Further, the term "vertex 423 of convex surface 421" is the intersection of convex surface 421 and central axis CA.

In a cross-section of marker 400 in the height direction (the Z direction), each convex surface 421 is a curve whose curvature radius increases as the distance from vertex 423 increases. The curvature radius may be continuously increased or intermittently increased with the increase of the distance from vertex 423.

The center-to-center distance ($|C_n-C_{n-1}|$) of first regions 341 adjacent to each other in the first direction (the X direction) and the third direction (the Y direction) is $P_{CL}$–nG μm, and the center-to-center distance ($|C_m-C_{m-1}|$) of first regions 341 adjacent to each other in the third direction is $P_{CL}$–mG μm. As described above, the "n" represents an order of a certain convex surface 421 with respect to 0th convex surface 421 in the first direction. The "m" represents an order of a certain convex surface 421 with respect to 0th convex surface 421 in the third direction.

With this configuration, first regions 341 corresponding to convex surfaces 421 located at respective distances from the center (n=0) convex surface 421 in the first direction (the X direction) are located on the center (n=0) convex surface 421 side relative to central axes CA of respective convex surfaces 421 in the first direction (the X direction). In addition, first regions 341 corresponding to convex surfaces 421 located at respective distances from the center (m=0) convex surface 421 in third direction (the Y direction) are located on the inner side relative to central axes CA of respective convex surfaces 421 in the third direction (the Y direction). That is, in the present embodiment, in the first direction (the X direction) and the third direction (the Y direction), the distance between vertices 423 of convex surfaces 421 adjacent to each other is greater than the center-to-center distance of first regions 341 adjacent to each other. In addition, also in the present embodiment, at the height of first region 341 in a cross section including the first direction and the height direction, the width or the diameter of the light flux formed by convex surfaces 421 is equal to or smaller than the width of first region 341.

Also in the present embodiment, first region 341 corresponds to a detection object part. In addition, second regions 342 have square shapes in plan view and are disposed adjacent to each other in the X direction and the Y direction. In the present embodiment, in plan view, the image plane has a shape identical to that of second region 342. In addition, in the present embodiment, the optical unit is a region having a substantially rectangular prism shape with second region 342 as the bottom surface, and with convex surface 421 as the top surface. In this optical unit, the highest point (F') in the field curvature is located at a corner of a rectangle of the optical unit as viewed in plan view.

Although not illustrated in the drawings, also in marker 400, when the observation angle is changed, the image of first region 341 is observed in the form of one image.

Effect

Accordingly, marker 400 has an effect similar to that of marker 300.

While the center-to-center distance of first regions 341 adjacent to each other is smaller than the distance between vertices 342 and 423 of convex surfaces 341 and 421 adjacent to each other in Embodiments 3 and 4, the center-to-center distance of first regions 341 adjacent to each other may be greater than the distance between vertices 342 and 423 of convex surfaces 341 and 421 adjacent to each other. Also in this case, first regions 341 are disposed on convex surfaces 321 and 421 side relative to the focal points of convex surfaces 321 and 421.

Embodiment 5

Figure 11:
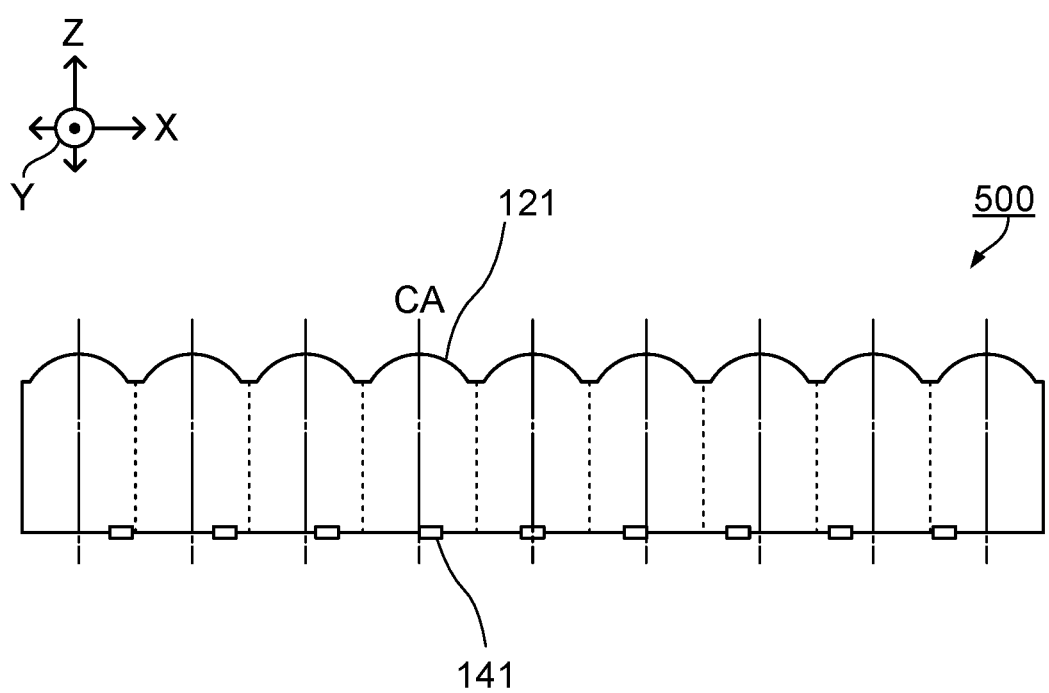
FIG. 11 schematically illustrates a configuration of a marker according to Embodiment 5 of the present invention.

In the marker, a gap may be provided between the convex surfaces adjacent to each other in the arrangement direction of the convex surfaces. The optical unit has a planar shape enclosed by lines connecting the middle points (equidistant points) of the convex surfaces adjacent to one another in the arrangement direction of the convex surfaces, and therefore, when the marker includes a gap between the convex surfaces, the optical unit is a region inside the middle points (equidistant points from the centers of the convex surfaces adjacent to one another in the arrangement direction) of the gap in the arrangement direction of the convex surfaces in its plane direction. For example, marker 500 illustrated in FIG. 11, which includes a gap (plane part) between the peripheries of the convex surfaces in the arrangement direction of the convex surfaces, the optical unit is represented by a portion enclosed by the first surface, the second surface and the broken line extending along the Z direction.

Embodiment 6

Figure 12A:
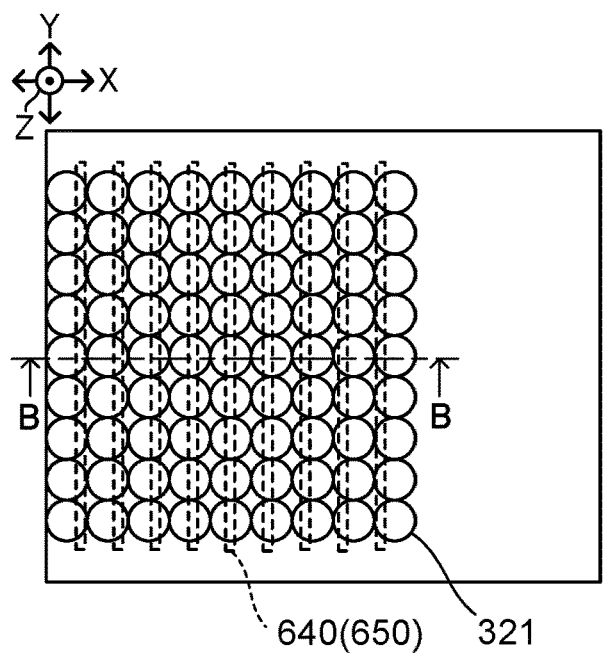
FIG. 12A schematically illustrates a plan view of a marker according to Embodiment 6 of the present invention.
Figure 12D:
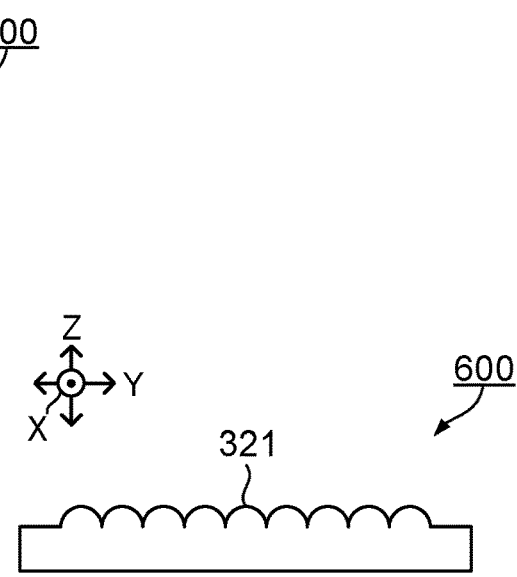
FIG. 12D is a side view schematically illustrating the side surface of the marker.
Figure 12B:
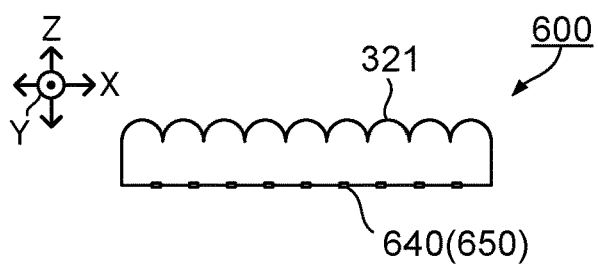
FIG. 12B is a partial sectional view schematically illustrating a part of the marker taken along line B-B of FIG. 12A, in which hatching is omitted.
Figure 12C:
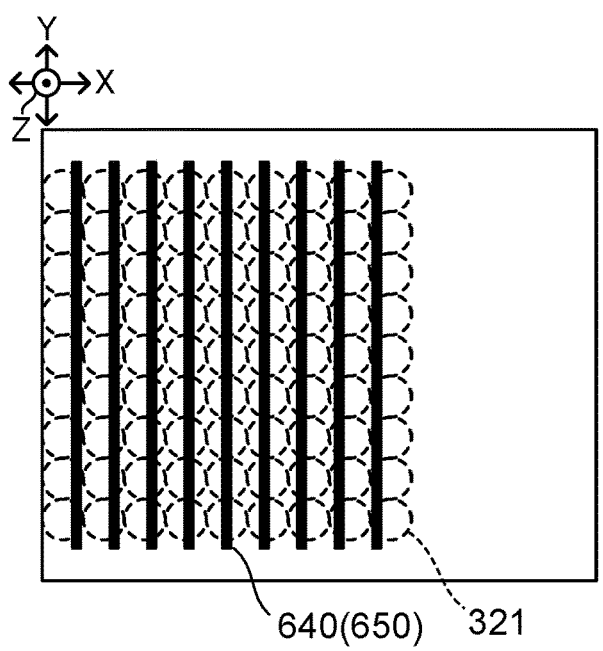
FIG. 12C is a bottom view schematically illustrating the bottom surface of the marker.

FIG. 12A is a plan view of marker 600, FIG. 12B is a partial sectional view schematically illustrating a part of marker 600 taken along line B-B of FIG. 12A, in which hatching is omitted, FIG. 12C is a bottom view of marker 600, and FIG. 12D is a side view of marker 600. The configuration of marker 600 is identical to that of marker 300 except that the detection object part is continuous in the Y direction.

Marker 600 includes a plurality of convex surfaces 321, and convex surfaces 321 are arranged in the X direction and the Y direction orthogonal to the X direction. Convex surfaces 321 are arranged in lines along the Y direction, and the lines of convex surface 321 are arranged in the X direction.

The detection object part is made up of recess 640 and coloring part 650 housed in recess 640. Recess 640 is a slender rectangular recess extending along the Y direction in the XY plane, and is disposed at a position such that recess 640 extends across convex surfaces 321 lined along the Y direction. In addition, recesses 640 correspond to the lines of convex surfaces 321, and are arranged in the X direction.

In the X direction, the detection object part is disposed corresponding to the line of convex surfaces 321 as in the embodiment described above. For example, in marker 600, in the X direction, the pitch of convex surfaces 321 adjacent to each other (the distance between convex surfaces 321 of adjacent lines) is greater than the center-to-center distance of detection object parts (recesses 640) adjacent to each other as with markers 300 and 400.

In addition, in a cross section (the XZ plane) of marker 600 along the X direction, the optical axes of convex surfaces 321 arranged in a line in the Y direction extend in the same direction (the Z direction). In addition, as in the above-mentioned embodiments, each detection object part is located on convex surface 321 side relative to the focal point of convex surface 321, and on the same virtual plane perpendicular to the height direction of marker 600 (the Z direction) in the XZ plane. As with the above-mentioned embodiments, the image plane is defined by one optical unit including one convex surface 321. As in marker 300, the optical unit of marker 600 is represented by a region having a substantially rectangular prism shape including one convex surface 321, and having a rectangular planar shape of a piece of a grid sectioning the first surface for each convex surface 321, for example.

In marker 600, linear images along the Y direction are observed as groups of images projected on convex surfaces 321. The image appears such that the image moves in a direction toward the viewer as marker 600 is tilted to the viewer side with respect to the X direction as with markers 300 and 400. In marker 600, convex surface 321 is curved not only in the X direction, but also in the Y direction, and thus, the contrast of the image in the Y direction in marker 600 is higher than that of marker 100. One possible reason for this may be that the shift of the focal point distance in the Y direction in marker 600 is smaller than that of marker 100.

As described above, marker 600 is formed of an optically transparent material, and includes a plurality of convex surfaces 321 disposed along the X direction and the Y direction, and a plurality of detection object parts disposed opposite to convex surfaces 321 and configured to be projected onto convex surfaces 321 in the form of optically detectable images. In addition, the detection object parts are disposed such that the detection object parts are located between respective convex surfaces 321 and focal points of respective convex surfaces 321 in the Z direction of the marker which are points remotest from respective convex surfaces 321 in image planes of respective convex surfaces 321 curved by field curvature, and that the detection object parts are located on the same virtual plane perpendicular to the Z direction of marker 600. The image plane is defined by one optical unit including one convex surface 321. Accordingly, as with markers 100 to 500, marker 600 can achieve downsizing and a wider detection angle in comparison with a marker in which the positions of the detection object parts are set only by the positions in the direction along the second surface.

Embodiment 7

Figure 13A:
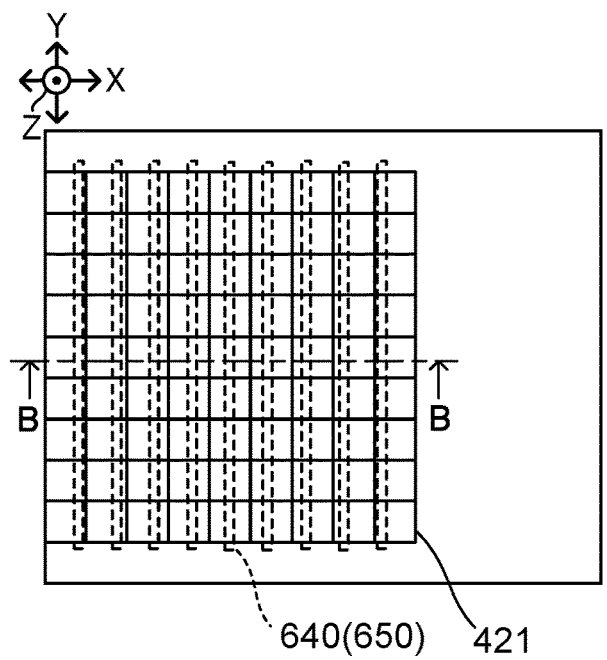
FIG. 13A is a plan view schematically illustrating a marker according to Embodiment 7 of the present invention.
Figure 13D:
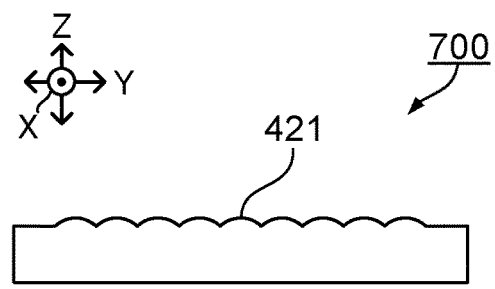
FIG. 13D is a side view schematically illustrating the side surface of the marker.
Figure 13B:
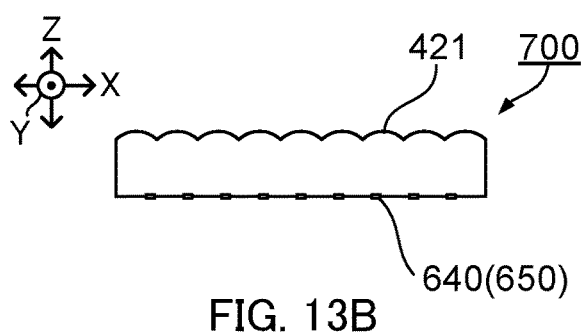
FIG. 13B is a partial sectional view schematically illustrating a part of the marker taken along line B-B of FIG. 13A, in which hatching is omitted.
Figure 13C:
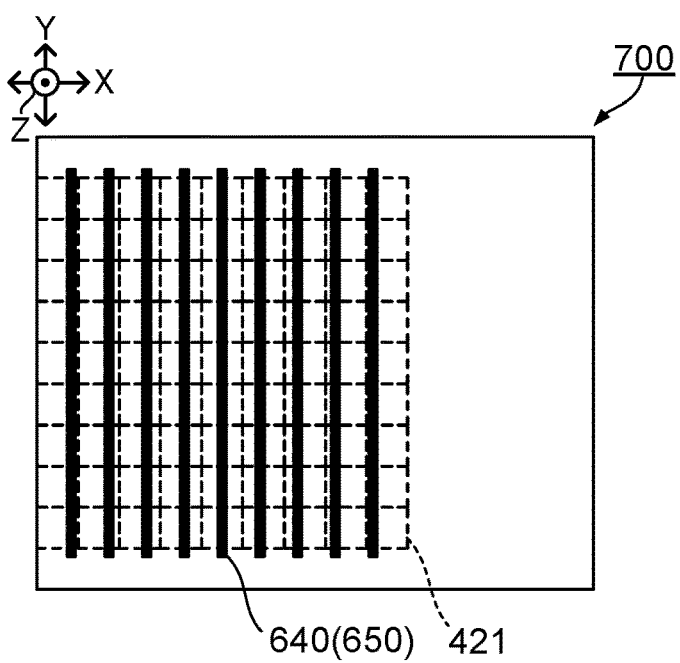
FIG. 13C is a bottom view schematically illustrating the bottom surface of the marker.

FIG. 13A is a plan view of marker 700, FIG. 13B is a partial sectional view schematically illustrating a part of marker 700 taken along line B-B of FIG. 13A, in which hatching is omitted, FIG. 13C is a bottom view of marker 700, and FIG. 13D is a side view of marker 700. The configuration of marker 700 is identical to that of marker 600 except that the planar shape of the convex surface is a rectangular shape. Alternatively, the configuration of marker 700 is identical to that of marker 400 except that the detection object part is continuous in the Y direction.

For example, convex surface 421 has a square shape in plan view. In addition, for example, in a cross section along the optical axis, convex surface 421 is represented by a curve whose curvature radius increases as the distance from the vertex of convex surface 421 increases. In addition, as in the above-mentioned embodiments, the detection object parts are disposed such that the detection object parts are located on convex surface 421 side relative to the focal point of convex surface 421 in the XZ plane and on the same virtual plane perpendicular to the height direction of marker 700 (the Z direction). Further, as with optical unit marker 400, marker 700 is represented by a region having a substantially rectangular prism shape including one convex surface 421, and having a (square) planar shape of a piece of a grid sectioning the first surface for each convex surface 421, for example.

As with markers 100 to 600, marker 700 can achieve downsizing and a wider detection angle in comparison with a marker in which the positions of the detection object parts are set only by the positions in the direction along the second surface. In addition, as with marker 600, marker 700 can provide a higher contrast of a detected image in the Y direction in comparison with marker 100.

Further, with marker 700, images can be more clearly detected regardless of the intensity of light incident on the first surface in comparison with marker 600. One possible reason for this may be that, practically, the first surface of marker 700 is composed only of convex surface 421 (curved surface) and includes no flat surface part, and thus reflection light at the first surface is less likely to be generated or is weak in comparison with marker 600 although, in the case where the intensity of the incident light is high, the intensity of the reflection light of marker 700 such as the reflection light on the first surface is also high, and the visibility of the image might be reduced.

Embodiment 8

Figure 14A:
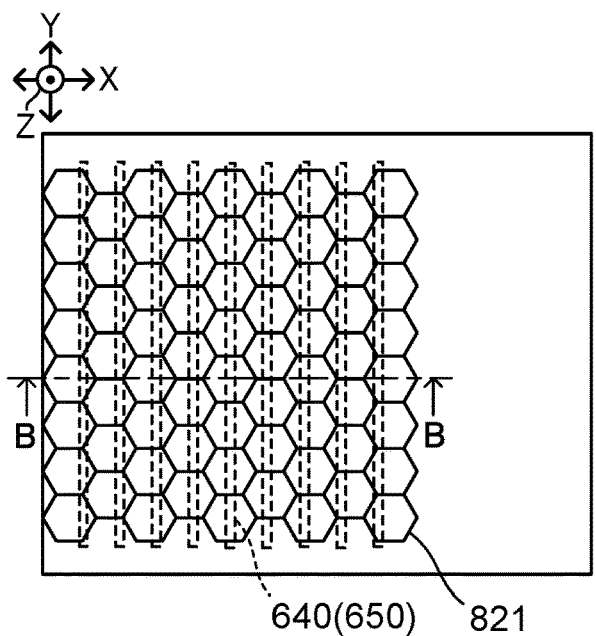
FIG. 14A is a plan view schematically illustrating a marker according to Embodiment 8 of the present invention.
Figure 14D:
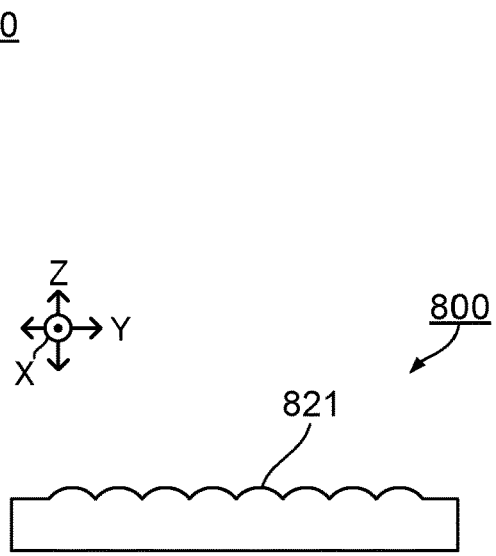
FIG. 14D is a side view schematically illustrating the side surface of the marker.
Figure 14B:
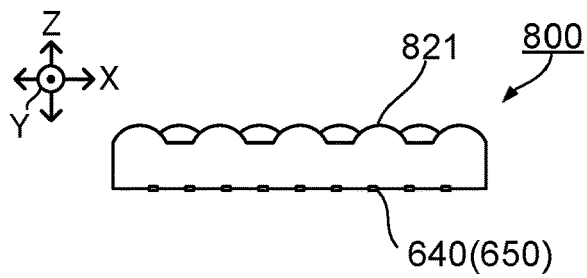
FIG. 14B is a partial sectional view schematically illustrating a part of the marker taken along line B-B of FIG. 14A, in which hatching is omitted.
Figure 14C:
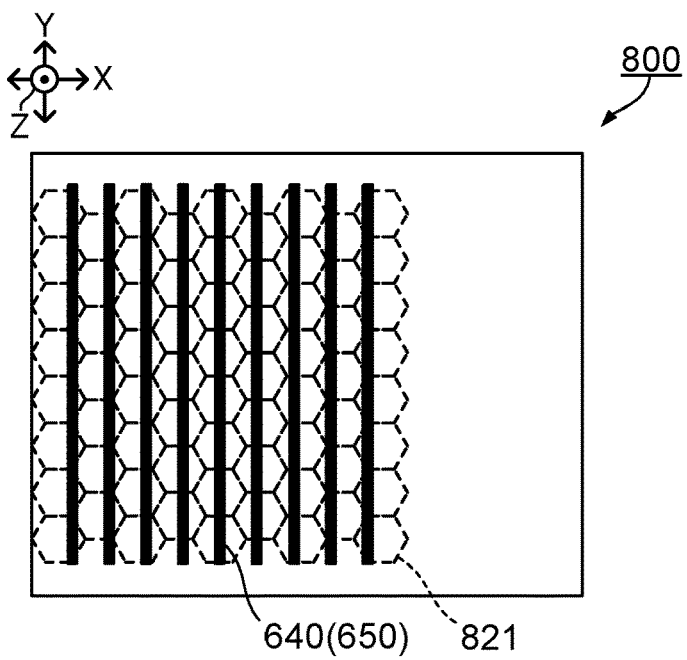
FIG. 14C is a bottom view schematically illustrating the bottom surface of the marker.

FIG. 14A is a plan view of marker 800, FIG. 14B is a partial sectional view schematically illustrating a part of marker 800 taken along line B-B of FIG. 14A, in which hatching is omitted, FIG. 14C is a bottom view of marker 800, and FIG. 14D is a side view of marker 800. As with marker 700, the configuration of marker 800 is identical to that of marker 600 except that the convex surface has a polygonal shape in plan view.

For example, in plan view, convex surface 821 has a regular hexagonal shape. In addition, for example, in a cross section along the optical axis, convex surface 821 is represented by a curve whose curvature radius increases as the distance from the vertex of convex surface 821 increases. Regarding the line of convex surfaces 821 in the Y direction, convex surfaces 821 are arranged along the Y direction such that their opposed sides are in contact with one another. In addition, the lines of convex surfaces 821 are arranged in the X direction such that each connecting part of convex surfaces 821 of one line is in contact with a corner of the hexagon of one convex surface 821 of another line. In this manner, in marker 800, convex surfaces 821 are fully closely arranged in a collective manner over the entirety of the first surface.

In addition, as in the above-mentioned embodiments, the detection object part is disposed such that the detection object part is located on convex surface 821 side relative to the focal point of convex surface 821, and on the same virtual plane perpendicular to the height direction (the Z direction) of marker 800 in the XZ plane. Further, as in markers 300 and 400, the optical unit of marker 800 is represented by a region having a substantially rectangular prism shape including one convex surface 821, and having a (square) planar shape of a piece of a grid sectioning the first surface for each convex surface 821 for example. The rectangle is defined with straight lines passing through the middle points of the sides shared by adjacent hexagons in the X direction, and straight lines that overlap the sides shared by adjacent hexagons in the Y direction.

As with markers 100 to 700, marker 800 can achieve downsizing and a wider detection angle in comparison with a marker in which the positions of the detection object parts are set only by the positions in the direction along the second surface. In addition, as with markers 600 and 700, marker 800 can provide a higher contrast of a detected image in the Y direction in comparison with marker 100.

Also, with marker 800, images can be more clearly detected regardless of the intensity of light incident on the first surface in comparison with marker 600, as with marker 700, and for the same reason as marker 700.

This application is entitled to and claims the benefit of Japanese Patent Application No. 2016-032857 dated Feb. 24, 2016, Japanese Patent Application No. 2016-071099 dated Mar. 31, 2016, Japanese Patent Application No. 2016-156762 dated Aug. 9, 2016, Japanese Patent Application No. 2016-208758 dated Oct. 25, 2016, the disclosure of which including the specification, drawings and abstract is incorporated herein by reference in its entirety.

INDUSTRIAL APPLICABILITY

The marker according to the embodiments of the present invention is suitable for a position detecting marker (or, an angle detecting marker) for recognizing the position, orientation and the like of an object. In addition, the marker according to the embodiments of the present invention can achieve downsizing and a wide detection angle. Furthermore, the marker according to the embodiments of the present invention is effective for reducing variation in visibility of a collective image depending on the observation angle of the marker. Accordingly, the present invention is expected to contribute to development of the technical fields of the above-mentioned marker.

REFERENCE SIGNS LIST 100, 200, 300, 400, 500, 600, 700, 800 Marker
120, 220, 320, 420 First surface
121, 221, 321, 421, 821 Convex surface
122 Ridgeline
140, 240, 340 Second surface
141, 241 Detection object part
142 Coating film 323, 423 Vertex
341 First region
342 Second region
640 Recess
650 Coloring part
A Virtual plane
B Image plane
CA Central axis
LA Optical axis
R Curvature radius

The invention claimed is:

1. A marker formed of an optically transparent material, the marker comprising:
 a plurality of convex surfaces disposed at least along a first direction; and
 a plurality of detection object parts respectively disposed opposite to the plurality of convex surfaces, and configured to be respectively projected onto the plurality of convex surfaces in a form of optically detectable images,
 wherein the plurality of detection object parts are disposed between respective convex surfaces and focal points of the respective convex surfaces in a height direction of the marker and disposed on one virtual flat plane perpendicular to the height direction of the marker, the focal points being points remotest from the respective convex surfaces in image planes of the respective convex surfaces, the image planes being curved by field curvature, and
 wherein each image plane is defined by one optical unit including one of the plurality of convex surfaces.

2. The marker according to claim 1, wherein a distance between the virtual plane and each convex surface is larger than a distance between the each convex surface and a point closest to the each convex surface in an image plane of the each convex surface, the image plane being curved by field curvature.

3. The marker according to claim 1, wherein a distance between the virtual plane and each convex surface is smaller than a distance between the each convex surface and a focal point of the each convex surface at least by a length of 5% of a focal length of the each convex surface on an optical axis of the each convex surface.

* * * * *